United States Patent [19]

White

[11] 4,163,257
[45] Jul. 31, 1979

[54] SPATIAL TONER FOR IMAGE RECONSTITUTION

[75] Inventor: Stanley A. White, Yorba Linda, Calif.

[73] Assignee: Rockwell International Corporation, El Segundo, Calif.

[21] Appl. No.: 864,962

[22] Filed: Dec. 27, 1977

[51] Int. Cl.² .............................................. H04N 7/12
[52] U.S. Cl. .................................. 358/133; 358/138; 364/515
[58] Field of Search ................. 358/133, 138; 364/515

[56] References Cited

U.S. PATENT DOCUMENTS

| | | | |
|---|---|---|---|
| 2,921,124 | 1/1960 | Graham | 358/138 |
| 3,051,778 | 8/1962 | Graham | 358/133 |
| 3,366,739 | 1/1968 | Parkinson | 358/133 |
| 4,068,266 | 1/1978 | Liao | 358/280 |

Primary Examiner—Howard W. Britton
Attorney, Agent, or Firm—L. Lee Humphries; H. Fredrick Hamann; Rolf M. Pitts

[57] ABSTRACT

An apparatus is described which is responsive to a sequence of received data-compacted pixels representative of a coarse two-dimensional image of a remote scene for reconstituting picture point intensity signals representative of the smoothly shading in of the coarse image. In a preferred embodiment the apparatus comprises: first means for utilizing the first one of the sequence of received data-compacted pixels to develop the initial intensity of the first one of a plurality of horizontal lines in a reconstructed image of the remote scene; second means for selectively generating horizontal and vertical gradient information as a function of the received pixels; third means selectively responsive to the initial intensity of any given horizontal line in the reconstituted image and to the associated vertical gradient information for developing by a first interpolation the initial intensity for the following horizontal line; and fourth means selectively responsive to the initial intensity of any given horizontal line and to the horizontal gradient information associated with that given horizontal line for computing a sequence of picture point intensities between each adjacent pair of received pixels in that horizontal line by a second interpolation.

6 Claims, 7 Drawing Figures

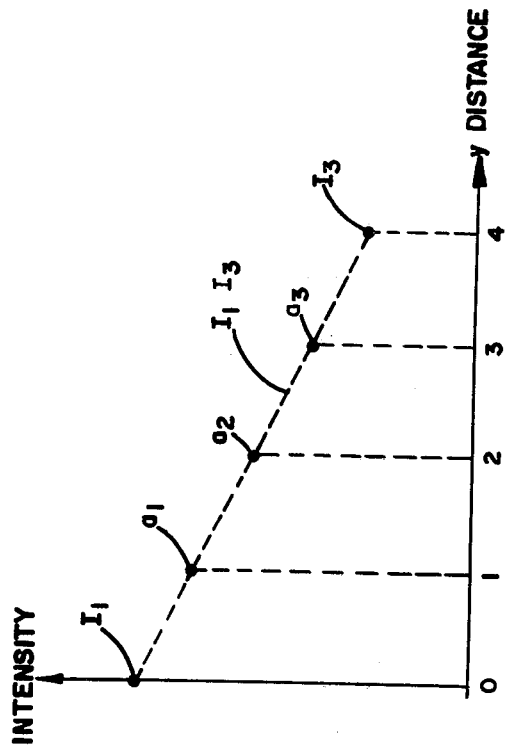
FIG. 4
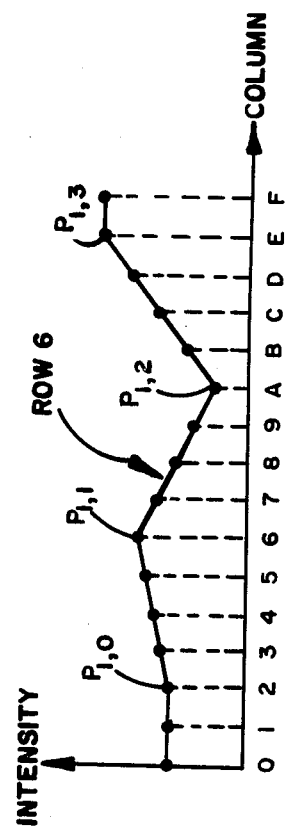
FIG. 6
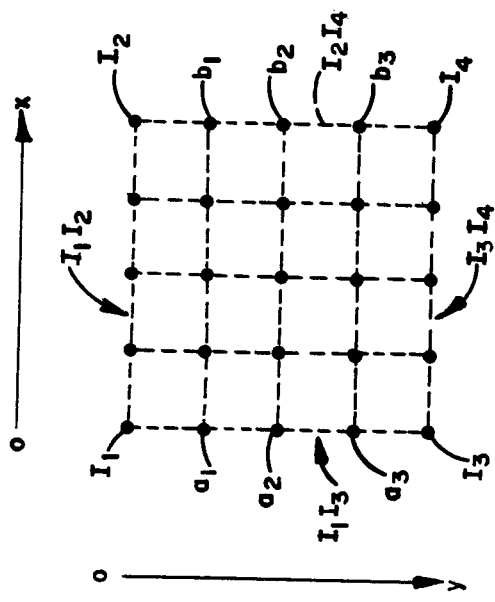
FIG. 3
FIG. 5

SPATIAL TONER FOR IMAGE RECONSTITUTION

BACKGROUND OF THE INVENTION

1. Field of the Invention

This invention relates to the reconstitution of a picture image from picture point intensities in a received, data-compacted picture image and particularly to an apparatus and method of picture-reconstitution by selectively shading in the received data-compacted image with suitable intensities computed by double linear interpolations from the received picture point intensities.

2. Description of the Prior Art

Communications systems for transmitting and reproducing remotely-viewed images and other two-dimensional patterns, such as television and facsimile systems, often employ broad band transmission channels to ensure faithful reproduction at the receiver end of the remotely viewed images being transmitted. Many of these systems employ a channel capacity greater than that required to send an amount of information actually necessary to describe the remotely viewed image. As a result, various systems have been proposed to reduce the bandwidth used for the transmission of signals by reducing the amount of information necessary to define a picture image. However, many of these proposed systems do not include means in the receiver for deriving any meaningful information regarding picture point intensities intermediate to the received picture element or pixel intensities. Only a few of these proposed systems do provide means in the receiver for developing a meaningfully interpolated pictorial output.

In U.S. Pat. No. 2,921,124 alternate sample and alternate field embodiments are disclosed for reducing channel capacity by discarding preselected signal periods (samples or fields) of a continuous succession of signal periods prior to transmission. At the receiving station the received signal data, consisting of only the retained signal periods, is restored to a signal equivalent to the original continuous succession of signal periods by using a one-dimensional interpolation technique on the received signal data. A similar one-dimensional interpolation technique is used on received data in U.S. Pat. No. 3,051,778 to restore the equivalent of scan lines alterntely deleted in the transmitter.

In U.S. Pat. No. 3,366,739 every fifth frame of a video image is transmitted and the intermediate four frames between consecutively transmitted frames are linearly interpolated in the receiver by combining progressively different complementary percentages of the consecutively transmitted frames. The system uses three variable output circuits which perform a multiplying function to accomplish this linear interpolation.

U.S. Pat. No. 3,725,684 teaches an implementation of an electronic calculating machine which performs a triple linear interpolation on data to develop a desired output quantity dependent on two input independent variables. The calculating machine forms sums and differences in a digital manner and products and quotients in an analog manner.

U.S. Pat. No. 3,996,456 discloses, in a one-dimensional recursive interpolation embodiment, the combination of a plurality of sample and hold circuits forming an analog shift register and of a computation unit to form a one-dimensional recursive interpolator. This patent further discloses a two-dimensional recursive interpolation embodiment wherein a single one-dimensional recursive interpolator scans, at a relatively rapid rate, the interpolated outputs of a series of slower one-dimensional interpolators to obtain a graphical output of a two-dimensional transducer array which includes interpolative information in the direction of both axes of the array.

In U.S. Pat. No. 4,032,977 expanded gray scale information is recovered from quantized video input data in a raster scanned imaging system by utilizing an interpolation process to predict a gray scale value for each element of output data from the quantized levels of an M by N matrix of input data elements. The prediction matrix for each output data element includes the spatially corresponding input data elements, together with vertically and horizontally adjacent input data elements.

None of the above-described prior art systems teaches or suggests applicant's simple apparatus (or method) for image reconstitution which is responsive to a sequence of received data-compacted pixels representing a two-dimensional coarse block image of a remote scene for computing by double linear interpolations intermediate picture point intensities in each of a plurality of horizontal lines to smoothly shade in the received coarse block image.

SUMMARY OF THE INVENTION

Briefly, an apparatus is provided for smoothing in the image between a sequence of widely spaced pixels in a received, data-compacted pixel-array representing a coarse block image of a remote scene in order to obtain a smooth continuous gradient across a two-dimensionally-interpolated, reconstituted image of the remote scene. The reconstituted image is comprised of a plurality of horizontal lines with each line containing a plurality of picture points. An input circuit is selectively responsive to the sequence of pixels for generating horizontal and vertical gradient information. A first circuit is coupled to the input circuit for utilizing the first one of the sequence of pixels to develop the initial intensity for the first horizontal line. A second circuit is selectively responsive to the initial intensity of a horizontal line and to vertical gradient information for developing by a first interpolation the initial intensity for the following horizontal line. A third circuit selectively combines interpolations of the horizontal gradient information with the initial intensity of any given horizontal line to develop by second interpolations a line of picture points along that horizontal line. A fourth circuit is coupled to the input circuit for updating the horizontal gradient information as a function of the vertical gradient information.

It is therefore an object of this invention to provide an improved spatial toner for image reconstitution.

Another object of this invention is to provide an apparatus and method of picture image reconstitution by selectively shading in widely spaced picture point intensities in a received data-compacted image with suitable intensities computed by double linear interpolations from the received picture point intensities.

Another object of this invention is to provide an apparatus and method for smoothing a coarse block image, which is defined by received intensities at the intersections of a rectangular mesh, by smoothly filling in each individual hole of the mesh with suitable intensities obtained by double linear interpolations from the received intensities existing at the four corners of each hole.

A further object of this invention is to provide an apparatus and method for image reconstitution which is responsive to a sequence of received data-compacted pixels representing a two-dimensional coarse block image of a remote scene for computing by double linear interpolations intermediate picture point intensities in each of a plurality of horizontal lines to smoothly shade in the received coarse block image.

BRIEF DESCRIPTION OF THE DRAWINGS

These and other objects, features and advantages of the invention, as well as the invention itself, will become more apparent to those skilled in the art in the light of the following detailed description taken in consideration with the accompanying drawings wherein like reference numerals indicate like or corresponding parts throughout the several views and wherein:

FIG. 3 illustrates a typical macro cell which is bounded at its four corners by received pixels.

FIG. 4 illustrates the vertical line $I_1I_3$ of intensity points on the left-hand side of the macro cell of FIG. 3.

FIG. 5 illustrates how the received intensity points of a macro cell are also used in conjunction with the shading in of adjacent cells.

FIG. 6 illustrates the graduation fluctuations in the intensities of the picture points that lie along row or line 6 of FIG. 1 (or FIG. 2).

DESCRIPTION OF THE PREFERRED EMBODIMENT

A remote TV camera (not shown) raster scans a remote image or scene to develop a plurality of lines of picture information, with a preselected number of picture elements (intensity points) or pixels per line. These pixels or intensity points represent values of intensities in the scanned pixel array. This pixel point array from the TV camera is reduced in a remote transmitter (not shown) to a much smaller array of pixel points by well-known image or data compaction techniques in order to decrease the bandwidth requirements of transmission. Thus, with image compaction, the transmitted picture has only a small number of lines of picture information with a reduced number of pixels per line.

Upon reception of this transmitted picture or data-compacted pixel array, it is desired to reconstitute or reconstruct a picture of the equivalent of the originally scanned remote image. The problem to be resolved is to smooth in the image between the widely spaced points in the transmitted array so that there is a continous gradient across the picture that is to be displayed. The resulting picture is only an approximation of the original image.

Figure 1:
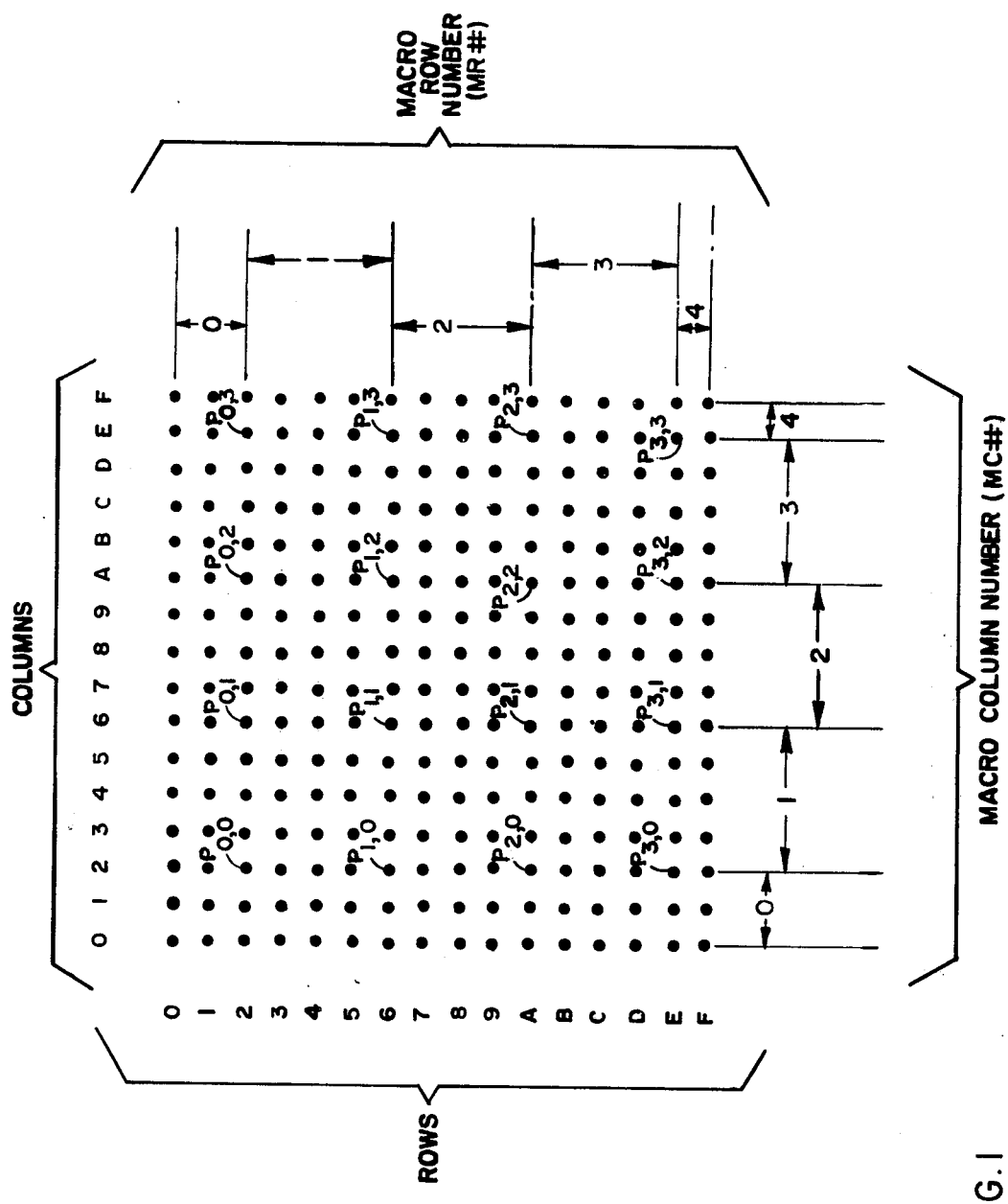
FIG. 1 illustrates an exemplary picture format of a 16×16 matrix or array of pixel (picture) points that is to be reconstituted from an exemplary 4×4 matrix or array of pixels (P's) that is received from a remote transmitter.

FIG. 1 illustrates an exemplary picture format of a 16×16 matrix or array of pixel (picture) points that is to be reconstituted from a received exemplary 4×4 matrix or array of pixels (P's), designated as $P_{0,0} \ldots P_{3,3}$, that are received from the remote transmitter. In comparison with the 525 lines of picture information in an ordinary broadcase television picture, this exemplary picture of FIG. 1 is coarse, having only 16 lines of picture information and 16 picture points in each line. However, this simplified 16×16 array is sufficient to explain the method and apparatus of the invention. It should be clear to those skilled in the art that the principles of the invention are equally applicable to pictures having other formats.

Essentially, the picture of FIG. 1 can be likened to a coarse block image, defined by the received pixels ($P_{0,0} \ldots P_{3,3}$) at the intersections of a two-dimensional square mesh. Each hole in the mesh is to be filled in or shaded in with computed intensity points obtained from the pixels existing at the four corners of the hole.

The 4×4 pixel array ($P_{0,0} \ldots P_{3,3}$) in the received picture is to be shaded in by reconstituting or reconstructing it back into the 16×16 pixel-format (of 16 lines or rows of picture information and 16 pixels per line) that was developed by the TV camera at the transmitter end. This reconstituted 16×16 pixel array will be developed along the 16 horizontal lines or rows and 16 vertical columns or columns that are illustrated in FIG. 1. However, it should be noted that each of the 16 lines to be shaded in is not really an analog or continuous line, but rather a sequence of 16 points of computed intensities.

For the sake of convenience, hexadecimal notation is used to identify the locations of the reconstituted 16×16 array of pixel points. Thus, a sequence of sixteen numbers can be represented by the following sixteen characters: 0, 1, 2, 3, 4, 5, 6, 7, 8, 9, A, B, C, D, E and F. As shown in FIG. 1, each picture point location is described by a hexadecimal number, with the first character corresponding to an associated one of the 16 rows (0, 1 ... 9, A, B ... F) and the second character corresponding to an associated one of the 16 columns (0, 1 ... 9, A, B ... F).

As further shown in the exemplary picture format of FIG. 1, the 4×4 array of received pixels ($P_{0,0} \ldots P_{3,3}$) is used to form 5 horizontal MR's or macro (large) rows (0, 1 ... 4) and 5 vertical MC's or macro (large) columns (0, 1 ... 4). Macro rows (MR's) 0, 1 ... 4 respectively include horizontal lines or rows 0–2, 2–6, 6–A, A–E and E–F; and macro columns (MC's) 0, 1 ... 4 respectively include vertical columns 0–2, 2–6, 6–A, A–E and E–F. It can be seen that there is a shared boundary between adjacent macro rows and a shared boundary between adjacent macro columns.

Figure 2:
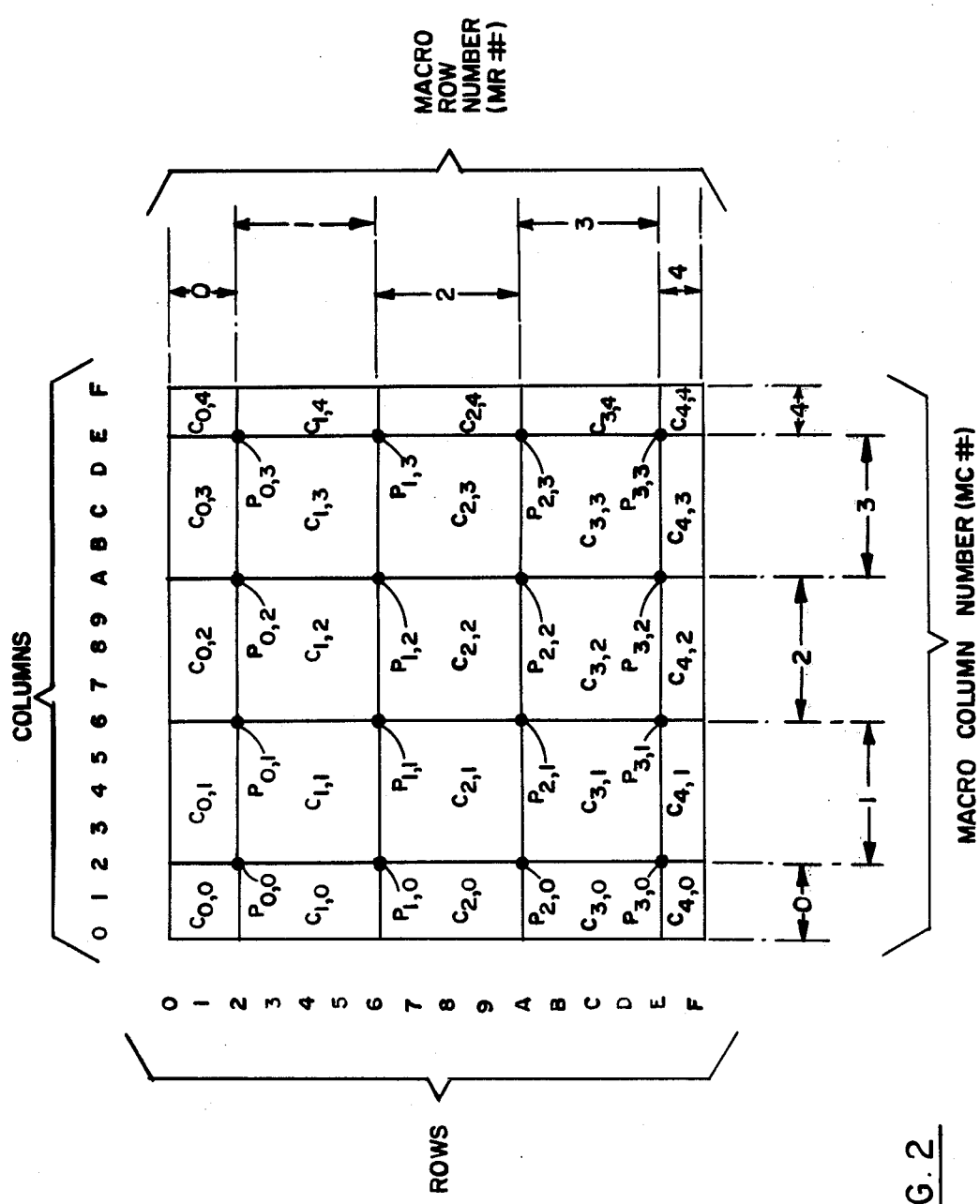
FIG. 2 illustrates how the received exemplary 4×4 array of pixels (P's) forms macro rows and macro columns, and how the intersections of macro rows and macro columns form macro cells and fractional cells.

Referring now to FIG. 2, FIG. 2 illustrates how the received exemplary 4×4 array of pixels ($P_{0,0} \ldots P_{3,3}$) forms these macro rows and macro columns, and how the intersections of these macro rows and macro columns form macro cells and fractional cells (C). For example, the interception of one of the macro rows 1, 2 and 3 with one of the macro columns 1, 2 and 3 identifies what will be called a macro (large) cell. A macro cell is an area of the picture of FIG. 2 which is bounded in its four corners by four of the received pixels. For example, pixels $P_{0,0}$, $P_{0,1}$, $P_{1,0}$ and $P_{1,1}$ define the boundaries of macro cell $C_{1,1}$. The interception of one of the macro rows 0 and 4 with one of the macro columns 0, 1 ... 4 produces what will be called a fractional cell. Likewise, the interception of one of the macro columns 0 and 4 with one of the macro rows 0, 1 ... 4 produces a fractional cell. A fractional cell lies in a border area of the picture of FIG. 2 and is bounded in its four corners by only one or two of the received pixels. For example, corner fractional cell $C_{0,0}$ is bounded by only one of the received pixels ($P_{0,0}$), whereas top fractional cell $C_{0,2}$ is bounded by two of the received pixels ($P_{0,1}$ and $P_{0,2}$).

The location of a macro or fractional cell (C) is defined by a pair of subscripted numbers. The first subscripted number designates the macro row the cell is found in, whereas the second subscripted number designates the macro column the cell is found in. For example, fractional cell $C_{0,0}$ is located in macro row 0 and macro column 0; macro cell $C_{1,3}$ is located in macro row 1 and macro column 3; and fractional cell $C_{4,3}$ is located in macro row 4 and macro column 3. Thus, the exemplary picture format to be shaded in, as shown in FIG. 2, contains a 5 by 5 array of 25 macro and fractional cells $C_{00}$ ... $C_{44}$. Note that the top and bottom macro rows 0 and 4 respectively contain fractional cells $C_{00}$ ... $C_{04}$ and $C_{40}$ ... $C_{44}$; and that left and right macro columns 0 and 4 respectively contain fractional cells $C_{00}$ ... $C_{40}$ and $C_{04}$ ... $C_{44}$.

In its operation (to be discussed) the invention selectively utilizes the four received corner pixels of each macro cell of FIG. 2 to compute and smoothly fill in the picture points, shown in FIG. 1, that lie within the boundaries of that macro cell. The invention computes these picture points for a macro cell by a double linear interpolation. Whenever fractional cells are involved (in border areas), as shown in FIGS. 1 and 2, the invention selectively fills in each fractional cell with either zero or one-dimensional linear interpolations.

Since the number of macro cells ($3^2$), macro cell size ($4 \times 4$ points), and exemplary picture format (16 by 16 points) are known in advance, the borders (top, bottom, left-hand and right-hand) can be pre-selectively balanced around the reconstructed array. For purposes of this discussion let: macro row 0 (top border) contain lines 0-2 (with line 2 being shared between macro row 0 and macro row 1); macro row 4 (bottom border) contain lines E and F (with line E being shared between macro row 3 and macro row 4); macro column 0 (left-hand border) contain columns 0-2 (with column 2 being shared between macro column 0 and macro column 1); and macro column 4 (right-hand border) contain columns E and F (with column E being shared between macro column 3 and macro column 4). The remaining macro rows and macro columns respectively contain the lines and columns indicated in FIG. 1.

To see how a macro cell is shaded in, reference will now be made to FIG. 3. FIG. 3 illustrates a typical macro cell 11 which is bounded at its four corners by received pixels. Let $I_1$, $I_2$, $I_3$ and $I_4$ represent the pixels or intensity points located at these four corners. These intensity (I) values represent the boundaries of the intensities that are to be shaded across the cell 11 and from the top to the bottom of the cell 11. The origin, for purposes of this discussion, is the upper left (UL)-hand corner pixel $I_1$. Positive horizontal motion in the x-direction is left-to-right from, for example, $I_1$ to $I_2$ in the upper right (UR)-hand corner. Positive vertical motion in the y-direction is defined as downward along the left-hand boundary from the origin $I_1$ to $I_3$ in the lower left (LL)-hand corner. Pixel $I_4$ is located in the lower right (LR)-hand corner to complete the cell 11.

By selectively utilizing the pixels $I_1$, $I_2$, $I_3$ and $I_4$, a sequence of intensities can be interpolated across any of the top, bottom, left-hand or right hand sides of the cell 11. Consider, for example, the linear gradients on the left-hand and right-hand sides of the cell 11. In terms of y the intensity of any intermediate point can be interpolated along the left-hand side ($I_L$) of the cell 11 by the equation:

$$I_L = I_1 + \frac{I_3 - I_1}{4} y \quad (1)$$

and along the right-hand side of the cell 11 by the equation:

$$I_R = I_2 + \frac{I_4 - I_2}{4} y \quad (2)$$

where:

y = the vertical displacement in discrete increments of 0, 1, 2, 3, 4, $I_L$ = the intensity values along the left-hand boundary of the cell 11, $I_R$ = the intensity values along the right-hand boundary of the cell 11, $I_1$ = the initial intensity at the top of the left-hand boundary of the cell 11, $I_2$ = the initial intensity at the top of the right-hand boundary of the cell 11, $(I_3 - I_1)/4$ = the vertical gradient along the left-hand boundary of the cell 11, and $(I_4 - I_2)/4$ = the vertical gradient along the right-hand boundary of the cell 11.

The number 4 that is used in the diameter of each of equations (1) and (2) is strictly an indicator of the distance between $I_1$ and $I_3$ in equation (1) and between $I_2$ and $I_4$ in equation (2). It has been previously assumed, for purposes of this discussion, that the distance between $I_1$ and $I_3$ and between $I_2$ and $I_4$ is 4, although in practice it would be a much larger number (N). Thus, in this explanation the variable y takes on the values of 0, 1, 2, 3 and 4. As a result, the boundary conditions are 0 and 4 which correspond to the case of y being respectively at locations $I_1$ and $I_3$ in equation (1) or respectively at locations $I_1$ and $I_4$ in equation (2).

The cell 11 of FIG. 3 can be smoothly shaded in (painted in, filled in) by the use of two operations.

In the first operation, as indicated in equations (1) and (2) and shown in FIG. 3, the vertical lines $I_1 I_3$ and $I_2 I_4$ (or sequences of interpolated intensity points) are shaded in from top to bottom on the left-hand and right-hand sides of the cell 11. Thus, the equations (1) and (2) are used to respectively establish the intensities along the left-hand and right-hand sides or boundaries of the cell 11. Each of these equations is an intercept-slope formula. In equation (1), for example, $I_1$ is basically an intercept number and the slope is $(I_3 - I_1)/4$ times y, the independent variable. Note that an intercept-slope formula is a linear fit along any boundary: $I_1$ to $I_3$, $I_2$ to $I_4$ or any place else along a boundary.

Each of the lines $I_1 I_3$ and $I_2 I_4$ contains 5 intensity points with two of the intensity points being received pixels and the remaining 3 exemplary points being computed intensity points. In shading in these lines ($I_1 I_3$ and $I_2 I_4$), an intensity is computed by interpolation for each of the 3 intermediate intensity points ($a_1$, $a_2$ and $a_3$) between the received intensity points $I_1$ and $I_3$ in the vertical line $I_1 I_3$, and for each of the 3 points ($b_1$, $b_2$ and $b_3$) between the received intensity points $I_2$ and $I_4$ in the vertical line $I_2 I_4$. Each of these vertical lines varies gradually in intensity whenever the associated received intensity points (e.g. $I_1$ and $I_3$) in a line (e.g. $I_1I_3$) have different intensities. For example, as aillustrated in FIG. 4, the vertical line $I_1I_3$ (on the left hand side of the macro cell of FIG. 3) contains the received intensity points $I_1$ and $I_3$ and the 3 intermediate computed intensity points $a_1$, $a_2$ and $a_3$, all of which vary gradually in intensity from $I_1$ to $I_3$.

In the second operation, the space between the computed vertical lines $I_1I_3$ and $I_2I_4$ of FIG. 3 can be substantially shaded in by computing the horizontal graduations of intensities between corresponding adjacent and computed points along the lines $I_1I_3$ and $I_2I_4$. The points $I_1$, $a_1$, $a_2$, $a_3$ and $I_3$ in line $I_1I_3$ respectively correspond in vertical position to the points $I_2$, $b_1$, $b_2$, $b_3$ and $I_4$ in line $I_2I_4$. Since there are 5 points along each of the vertical lines $I_1I_3$ and $I_2I_4$, there will be 5 horizontal lines shaded in between corresponding points in the lines $I_1I_3$ and $I_2I_4$. In other words, a sequence intensities can be interpolated across each of these horizontal lines. Like the vertical lines $I_1I_3$ and $I_2I_4$, each of the 5 horizontal lines is comprised of 5 intensity points, with two of the intensity points being corresponding points in the lines $I_1I_3$ and $I_2I_4$ and the remaining 3 points being computed intensity points between those corresponding points. In shading in each of these 5 horizontal lines ($I_1I_2$, $a_1b_1$, $a_2b_2$, $a_3b_3$ and $I_3I_4$), an intensity is computed by interpolation for each of the 3 intermediate intensity points in a horizontal line. Like the vertical line $I_1I_3$ of intensity points illustrated in FIG. 4, each of the 5 horizontal lines varies gradually in intensity whenever the corresponding end points (e.g., $a_2$ and $b_2$ in FIG. 3) in the lines $I_1I_3$ and $I_2I_4$ have different intensitites.

More specifically, this second operation is accomplished by applying the same intercept-slope formula that was used in equations (1) and (2) and also by ascribing the same value of y to both of equations (1) and (2) in order to do a linear fit between given points $I_L$ and $I_R$ of equations (1) and (2). In this manner, the intensity of an intermediate point $I_M$ can be computed between the given points $I_L$ and $I_R$ by the following equation:

$$I_M = I_L + \frac{I_R - I_L}{4} x \quad (3)$$

where the variable x will take on the values of 0, 1, 2, 3 and 4.

Substituting the values of $I_L$ and $I_R$ from equations (1) and (2) into equation (3) and simplifying:

$$I_M = I_1 + (\frac{I_3 - I_1}{4})y + (\frac{I_2 - I_1}{4})x + (\frac{I_1 - I_2 - I_3 + I_4}{4^2})xy \quad (4)$$

where:
$I_M$ = the intensity of an intermediate point at horizontal position x and vertical position y,
x = the discrete increments (0, 1, 2, 3, 4) of horizontal displacement (or position) from the left-side of the cell,
y = the discrete increments (0, 1, 2, 3, 4) of vertical displacement (or position) from the top side of the cell,
$I_1$ = the initial intensity at the top of the left-hand boundary of the cell 11, where y=0 and x=0, $(I_3 - I_1)/4$ = the vertical gradient along the left-hand boundary of the cell,
$(I_2 - I_1)/4$ = the horizontal gradient across the upper boundary of the cell, and
$(I_1 - I_2 - I_3 + I_4)/4^2$ = the total gradient from the upper left corner to the lower right corner of the cell (or the gradient in terms of both x and y).

By the use of equation (4) the entire macro cell 11 of FIG. 3 can be smoothly shaded in from the original four intensity points $I_1$, $I_2$, $I_3$ and $I_4$ for that macro cell.

An examination of equation (4) discloses that the intermediate intensity $I_M$ is composed of four terms: $I_1$ (the initial intensity of cell 11), plus a vertical weighting value comprised of a vertical gradient $(I_3 - I_1)/4$ times y, plus a horizontal gradient $(I_2 - I_1)/4$ times x, plus a total gradient (or horizontal gradient update quantity) $(I_1 - I_2 - I_3 + I_4)/4^2$ times the product xy (or gradient with respect to both x and y).

If the partial derivative of the intermediate intensity $I_M$ of equation (4) is taken with respect to x the following equation (5) is obtained for deriving horizontal gradient information.

$$\frac{\partial I_M}{\partial x} = \frac{I_2 - I_1}{4} + \frac{I_1 - I_2 - I_3 + I_4}{4^2} y \quad (5)$$

Equation (5) shows the horizontal gradient $(I_2 - I_1)/4$ plus the horizontal gradient update quantity $(I_1 - I_2 - I_3 + I_4)/4^2$, which is a function of the four corner intensities, times y. Thus, equation (5) supplies the horizontal gradient information for any given line by computed intensity points across a macro cell.

To establish the proper vertical weighting value of intensity in terms of y for the start of a horizontal sweep across a given horizontal line of a macro cell, the vertical gradient of the intensity along the lefthand side (e.g. line $I_1I_3$ in FIG. 3) of the macro cell (11) must be known. This vertical gradient can be obtained by taking the partial derivative of the intermediate intensity $I_M$ with respect to y, resulting in the following equation:

$$\frac{\partial I_M}{\partial y} \bigg|_{x=0} = \frac{I_3 - I_1}{4} \quad (6)$$

By taking the second derivative of equation (5) with respect to y, the horizontal gradient update quantity is derived, as shown in equation (7) below, for correcting the y-dependent part of the intensity in equation (5).

$$\frac{\partial^2 I_M}{\partial x \partial y} = \frac{I_1 - I_2 - I_3 + I_4}{4^2} \quad (7)$$

It should be noted at this time that the received intensity points (e.g., $I_1$, $I_2$, $I_3$, $I_4$) at the corners of a macro cell are also used in conjunction with the shading in of adjacent macro and fractional cells. FIG. 5 specifically illustrates how the received intensity points ($I_1$, $I_2$, $I_3$, $I_4$) of an exemplary macro cell ($C_{j,k}$) are also used in conjunction with the shading in of adjacent cells. As shown in FIG. 5:

$I_1$ of cell $C_{j,k}$ = $I_4$ of cell $C_{j-1,k-1}$ = $I_3$ of cell $C_{j-1,k}$ = $I_2$ of cell $C_{j,k-1}$ $I_2$ of cell $C_{j,k}$ = $I_4$ of cell $C_{j-1,k}$ = $I_3$ of cell $C_{j-1,k+1}$ = $I_1$ of cell $C_{j,k+1}$ $I_3$ of cell $C_{j,k} = I_4$ of cell $C_{j,k-1} = I_2$ of cell
$C_{j+1,k-1} = I_1$ of cell $C_{j+1,k}$ $I_4$ of cell $C_{j,k} = I_3$ of cell $C_{j,k+1} = I_2$ of cell
$C_{j+1,k} = I_1$ of cell $C_{j+1,k+1}$ This re-use of the received pixels or intensity points ($I_1$, $I_2$, $I_3$, $I_4$) of a macro cell in adjacent macro and fractional macro cells makes equation (4) equally applicable to the shading in of each of the cells $C_{0,0} \ldots C_{4,4}$ shown in FIG. 2. Furthermore, an examination of Equation (4) and of FIG. 3 reveals that each of the macro cells in FIG. 2 has both vertical and horizontal gradients, since each macro cell contains four received pixels or intensity points at the four corners of that macro cell. Thus, each macro cell is shaded in by double linear interpolation, as shown in Equation (4), from the received pixels existing at the four corners of that macro cell.

However, unlike the macro cells, the border cells, which are fractional cells, are not shaded in with double linear interpolation. Each of the border cells has either only one or neither of horizontal and vertical gradients. Referring back to FIG. 2, it can be seen that the border areas are comprised of UL, UR, LL and LR corner cells ($C_{0,0}$, $C_{0,4}$, $C_{4,0}$ and $C_{4,4}$) each containing only one pixel, and top, left, right and bottom border cells ($C_{0,1} \ldots C_{0,3}$, $C_{1,0} \ldots C_{3,0}$, $C_{1,4} \ldots C_{3,4}$ and $C_{4,1} \ldots C_{4,3}$) each containing only two pixels. Each of the corner cells is shaded in with an intensity equal to the intensity of the associated pixel (e.g., point $P_{0,0}$ of corner cell $C_{0,0}$). Thus, the corner cells are each substantially solid in intensity with no gradients. On the other hand, each of the remaining border cells has a gradient between the two intensity points associated with that border cell (e.g. points $P_{0,0}$ and $P_{0,1}$ of top border cell $C_{0,1}$), but has no gradient between a point (e.g. $P_{0,1}$) and the extreme edge (e.g. top border) of the picture.

FIG. 6 illustrates the graduation fluctuations in the intensities of the picture points that lie along, for example, row or line 6 of FIG. 1 (or FIG. 2). The intensity of each intensity point along line or row 6 is given by $I_M$ of equation (4) and is computed across the entire picture in response to the received intensity points $P_{1,0} \ldots P_{1,3}$. Note that there is a fixed slope for the associated line segment of row 6 that passes through each of the cells $C_{1,0} \ldots C_{1,4}$ (or cells $C_{2,0} \ldots C_{2,4}$, since the received intensity points $P_{1,0} \ldots P_{1,3}$ are shared between adjacent cells).

Thus, in reconstituting the remote picture image for any macro or fractional cell area of the picture that is being shaded in, the proper intensity of the horizontal beam for any intensity point $I_M$ location in a cell can be generated by starting with the initial intensity for that cell, weighting that initial intensity of the cell by the product of the vertical gradient and the vertical displacement in y, and incrementing that weighted initial value according to the product of the updated horizontal gradient and the horizontal displacement in x. Wherever no gradient is present (gradient=0), the associated term of equation (4) drops out.

The spatial toner of this invention is implemented directly from the above equations. A block diagram of a preferred embodiment of the spatial toner invention is illustrated in FIG. 7 which will now be discussed.

Figure 7:
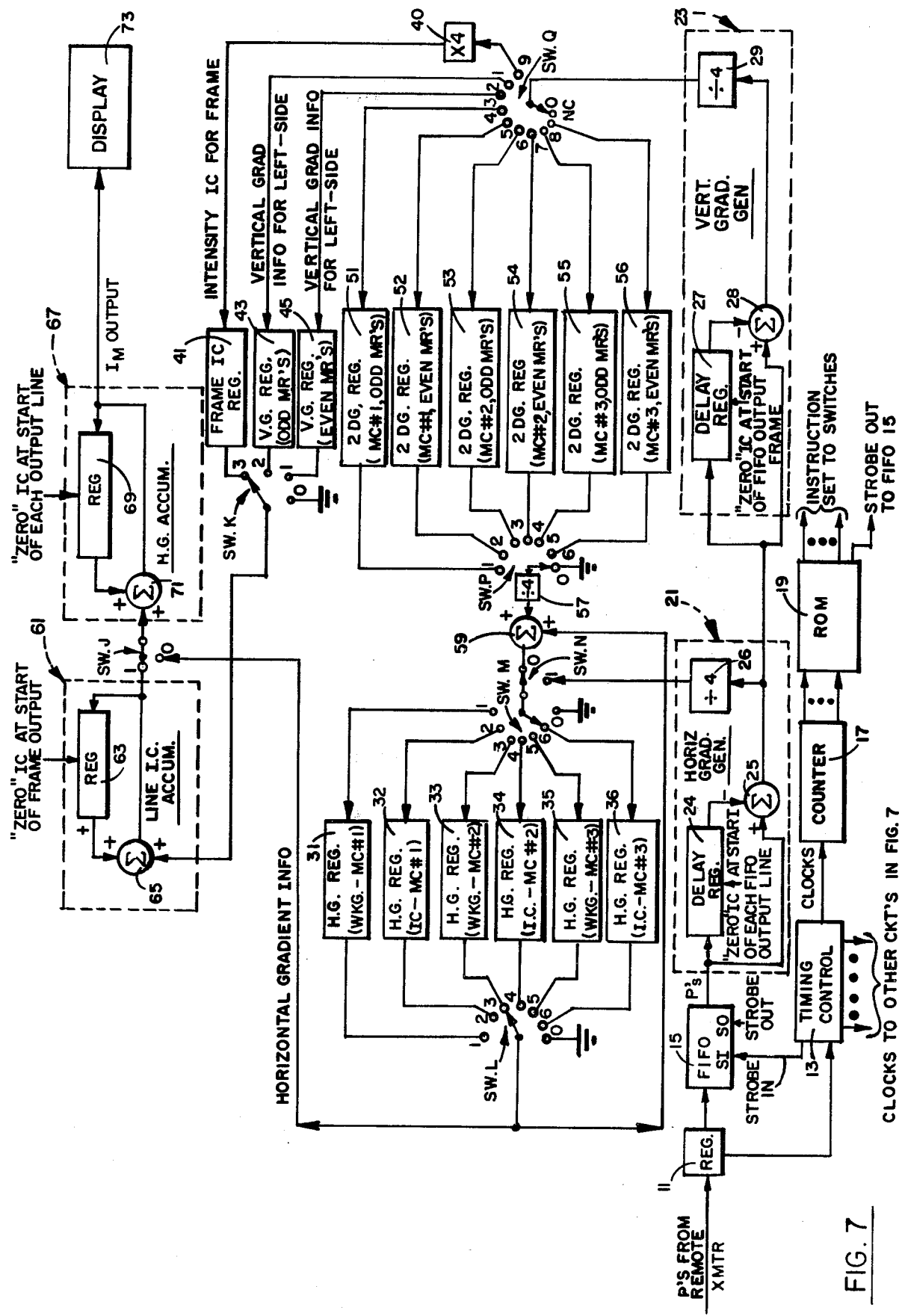
FIG. 7 illustrates a block diagram of a preferred embodiment of the invention.

The spatial toner mechanization illustrated in FIG. 7 computes the intensities of picture points (I's) in order to reconstitute an exemplary array of picture points ($I_{0,0} \ldots I_{FF}$) from the exemplary 4 by 4 array of pixels ($P_{0,0} \ldots P_{3,3}$) being transmitted from the remote transmitter. It should be understood, however, that any other suitable reconstructed or reconstituted picture point array, as well as other suitable input pixel array, could be used within the purview of the invention. Also, for purposes of this discussion, let the amplitude of each of the received pixels $P_{0,0} \ldots P_{3,3}$ be represented by an 8-bit wide binary number.

A sequence of modulated, reduced-bandwidth, data signals containing the exemplary 4 by 4 array of pixels $P_{0,0} \ldots P_{3,3}$ (FIGS. 1 and 2) from the remote transmitter is transmitted through a transmission channel (not shown) before being demodulated by a receiver 11. A timing control circuit 13 uses transmitted synchronizing pulses contained in the demodulated data signals to synchronize the overall system of FIG. 7. The timing control circuit 13 can be a computer, a tape, circuitry and/or some other suitable device that produces clocks to strobe the 16 received pixels ($P_{0,0} \ldots P_{3,3}$) into a first-in, first-out (FIFO) register circuit 15. At a preselected later time the timing control circuit 13 supplies to a counter 17 a sequence of 256 clocks—one clock for each pixel to be computed in the 16×16 pixel array of FIG. 1. The output counts of the counter 17 are used as addresses to enable a read only memory (ROM) 19 to generate an instruction set to control the positions of various switches (J, K, L, M, N, P and Q) in the system. In addition, the ROM 19 selectively applies at preselected times a sequence of 16 "strobe out" clocks to strobe the 16 received pixels out of the FIFO circuit 15. The instruction set utilized by the switches J, K, L, M, N, P and Q to enable the system of FIG. 7 to selectively use the received pixels (P's) being strobed out of the FIFO 15 in the computation of the output pixels or intensity points (I's) are shown in the following TABLE 1 (to be discussed). Notice that the 256 different subscripts on the I's given in TABLE 1 respectively correspond to the 256 output valves (0 through 255) of the counter 17 in FIG. 7.

TABLE 1

| OUTPUT PIXEL ($I_M$) $I_{ROW,COL.}$ | INPUT PIXEL | POSITIONS OF SWITCHES | | | | | | OUTPUT PIXEL ($I_m$) $I_{ROW,COL.}$ | INPUT PIXEL | POSITIONS OF SWITCHES | | | | | |
|---|---|---|---|---|---|---|---|---|---|---|---|---|---|---|---|
| | | J | K | L | M | N | P | Q | | | J | K | L | M | N | P | Q |
| $I_{0,0}$ | — $P_{1,0}$ — | 1 | 3 | 0 | 0 | 0 | 0 | 1 | $I_{2,0}$ | -------- | 1 | 0 | 0 | 0 | 0 | 0 | 0 |
| $I_{0,1}$ | -------- | 0 | 0 | 0 | 0 | 0 | 0 | 0 | $I_{2,1}$ | -------- | 0 | 0 | 0 | 0 | 0 | 0 | 0 |
| $I_{0,2}$ | -------- | 0 | 0 | 0 | 0 | 0 | 0 | 0 | $I_{2,2}$ | -------- | 0 | 0 | 0 | 0 | 0 | 0 | 0 |
| $I_{0,3}$ | -------- | 0 | 0 | 2 | 1 | 0 | 0 | 0 | $I_{2,3}$ | -------- | 0 | 0 | 1 | 0 | 0 | 0 | 0 |
| $I_{0,4}$ | — $P_{1,1}$ — | 0 | 0 | 1 | 0 | 0 | 0 | 3 | $I_{2,4}$ | -------- | 0 | 0 | 1 | 0 | 0 | 0 | 0 |
| $I_{0,5}$ | -------- | 0 | 0 | 1 | 0 | 0 | 0 | 0 | $I_{2,5}$ | -------- | 0 | 0 | 1 | 0 | 0 | 0 | 0 |
| $I_{0,6}$ | -------- | 0 | 0 | 1 | 1 | 0 | 0 | 0 | $I_{2,6}$ | -------- | 0 | 0 | 1 | 1 | 0 | 1 | 0 |
| $I_{0,7}$ | -------- | 0 | 0 | 4 | 3 | 0 | 0 | 0 | $I_{2,7}$ | -------- | 0 | 0 | 3 | 0 | 0 | 0 | 0 |
| $I_{0,8}$ | — $P_{1,2}$ — | 0 | 0 | 3 | 0 | 0 | 0 | 5 | $I_{2,8}$ | -------- | 0 | 0 | 3 | 0 | 0 | 0 | 0 |
| $I_{0,9}$ | -------- | 0 | 0 | 3 | 0 | 0 | 0 | 0 | $I_{2,9}$ | -------- | 0 | 0 | 3 | 0 | 0 | 0 | 0 |
| $I_{0,A}$ | -------- | 0 | 0 | 3 | 3 | 0 | 0 | 0 | $I_{2,A}$ | -------- | 0 | 0 | 3 | 3 | 0 | 3 | 0 |

TABLE 1-continued

| OUTPUT PIXEL ($I_M$) $I_{ROW,COL.}$ | INPUT PIXEL | \multicolumn{7}{c}{POSITIONS OF SWITCHES} | OUTPUT PIXEL ($I_m$) $I_{ROW,COL.}$ | INPUT PIXEL | \multicolumn{7}{c}{POSITIONS OF SWITCHES} |
|---|---|---|---|---|---|---|---|---|---|---|---|---|---|---|---|---|
| | | J | K | L | M | N | P | Q | | | J | K | L | M | N | P | Q |
| $I_{0,B}$ | -------- | 0 | 0 | 6 | 5 | 0 | 0 | 0 | $I_{2,B}$ | -------- | 0 | 0 | 5 | 6 | 0 | 0 | 0 |
| $I_{0,C}$ | ---- $P_{1,3}$ ---- | 0 | 0 | 5 | 0 | 0 | 0 | 7 | $I_{2,C}$ | -------- | 0 | 0 | 5 | 0 | 0 | 0 | 0 |
| $I_{0,D}$ | -------- | 0 | 0 | 5 | 0 | 0 | 0 | 0 | $I_{2,D}$ | -------- | 0 | 0 | 5 | 0 | 0 | 0 | 0 |
| $I_{0,E}$ | -------- | 0 | 0 | 5 | 5 | 0 | 0 | 0 | $I_{2,E}$ | -------- | 0 | 0 | 5 | 5 | 0 | 5 | 0 |
| $I_{0,F}$ | -------- | 0 | 0 | 0 | 0 | 0 | 0 | 0 | $I_{2,F}$ | -------- | 0 | 0 | 0 | 0 | 0 | 0 | 0 |
| $I_{1,0}$ | -------- | 1 | 0 | 0 | 0 | 0 | 0 | 0 | $I_{3,0}$ | -------- | 1 | 2 | 0 | 0 | 0 | 0 | 0 |
| $I_{1,1}$ | -------- | 0 | 0 | 0 | 0 | 0 | 0 | 0 | $I_{3,1}$ | -------- | 0 | 0 | 0 | 0 | 0 | 0 | 0 |
| $I_{1,2}$ | -------- | 0 | 0 | 0 | 0 | 0 | 0 | 0 | $I_{3,2}$ | -------- | 0 | 0 | 0 | 0 | 0 | 0 | 0 |
| $I_{1,3}$ | -------- | 0 | 0 | 1 | 0 | 0 | 0 | 0 | $I_{3,3}$ | -------- | 0 | 0 | 1 | 0 | 0 | 0 | 0 |
| $I_{1,4}$ | -------- | 0 | 0 | 1 | 0 | 0 | 0 | 0 | $I_{3,4}$ | -------- | 0 | 0 | 1 | 0 | 0 | 0 | 0 |
| $I_{1,5}$ | -------- | 0 | 0 | 1 | 0 | 0 | 0 | 0 | $I_{3,5}$ | -------- | 0 | 0 | 1 | 0 | 0 | 0 | 0 |
| $I_{1,6}$ | -------- | 0 | 0 | 1 | 1 | 0 | 0 | 0 | $I_{3,6}$ | -------- | 0 | 0 | 1 | 1 | 0 | 1 | 0 |
| $I_{1,7}$ | -------- | 0 | 0 | 3 | 0 | 0 | 0 | 0 | $I_{3,7}$ | -------- | 0 | 0 | 3 | 0 | 0 | 0 | 0 |
| $I_{1,8}$ | -------- | 0 | 0 | 3 | 0 | 0 | 0 | 0 | $I_{3,8}$ | -------- | 0 | 0 | 3 | 0 | 0 | 0 | 0 |
| $I_{1,9}$ | -------- | 0 | 0 | 3 | 0 | 0 | 0 | 0 | $I_{3,9}$ | -------- | 0 | 0 | 3 | 0 | 0 | 0 | 0 |
| $I_{1,A}$ | -------- | 0 | 0 | 3 | 3 | 0 | 0 | 0 | $I_{3,A}$ | -------- | 0 | 0 | 3 | 3 | 0 | 3 | 0 |
| $I_{1,B}$ | -------- | 0 | 0 | 5 | 0 | 0 | 0 | 0 | $I_{3,B}$ | -------- | 0 | 0 | 5 | 0 | 0 | 0 | 0 |
| $I_{1,C}$ | -------- | 0 | 0 | 5 | 0 | 0 | 0 | 0 | $I_{3,C}$ | -------- | 0 | 0 | 5 | 0 | 0 | 0 | 0 |
| $I_{1,D}$ | -------- | 0 | 0 | 5 | 0 | 0 | 0 | 0 | $I_{3,D}$ | -------- | 0 | 0 | 5 | 0 | 0 | 0 | 0 |
| $I_{1,E}$ | -------- | 0 | 0 | 5 | 5 | 0 | 0 | 0 | $I_{3,E}$ | -------- | 0 | 0 | 5 | 5 | 0 | 5 | 0 |
| $I_{1,F}$ | -------- | 0 | 0 | 0 | 0 | 0 | 0 | 0 | $I_{3,F}$ | -------- | 0 | 0 | 0 | 0 | 0 | 0 | 0 |
| $I_{4,0}$ | ---- $P_{2,0}$ ---- | 1 | 2 | 0 | 0 | 0 | 0 | 2 | $I_{6,0}$ | -------- | 1 | 2 | 0 | 0 | 0 | 0 | 0 |
| $I_{4,1}$ | -------- | 0 | 0 | 0 | 0 | 0 | 0 | 0 | $I_{6,1}$ | -------- | 0 | 0 | 0 | 0 | 0 | 0 | 0 |
| $I_{4,2}$ | -------- | 0 | 0 | 0 | 0 | 0 | 0 | 0 | $I_{6,2}$ | -------- | 0 | 0 | 0 | 0 | 0 | 0 | 0 |
| $I_{4,3}$ | -------- | 0 | 0 | 1 | 0 | 0 | 0 | 0 | $I_{6,3}$ | -------- | 0 | 0 | 1 | 0 | 0 | 0 | 0 |
| $I_{4,4}$ | ---- $P_{2,1}$ ---- | 0 | 0 | 1 | 0 | 0 | 0 | 4 | $I_{6,4}$ | -------- | 0 | 0 | 1 | 0 | 0 | 0 | 0 |
| $I_{4,5}$ | -------- | 0 | 0 | 1 | 0 | 0 | 0 | 0 | $I_{6,5}$ | -------- | 0 | 0 | 1 | 0 | 0 | 0 | 0 |
| $I_{4,6}$ | -------- | 0 | 0 | 1 | 1 | 0 | 1 | 0 | $I_{6,6}$ | -------- | 0 | 0 | 1 | 1 | 0 | 2 | 0 |
| $I_{4,7}$ | -------- | 0 | 0 | 3 | 0 | 0 | 0 | 0 | $I_{6,7}$ | -------- | 0 | 0 | 3 | 0 | 0 | 0 | 0 |
| $I_{4,8}$ | ---- $P_{2,2}$ ---- | 0 | 0 | 3 | 0 | 0 | 0 | 6 | $I_{6,8}$ | -------- | 0 | 0 | 3 | 0 | 0 | 0 | 0 |
| $I_{4,9}$ | -------- | 0 | 0 | 3 | 0 | 0 | 0 | 0 | $I_{6,9}$ | -------- | 0 | 0 | 3 | 0 | 0 | 0 | 0 |
| $I_{4,A}$ | -------- | 0 | 0 | 3 | 3 | 0 | 3 | 0 | $I_{6,A}$ | -------- | 0 | 0 | 3 | 3 | 0 | 4 | 0 |
| $I_{4,B}$ | -------- | 0 | 0 | 5 | 0 | 0 | 0 | 0 | $I_{6,B}$ | -------- | 0 | 0 | 5 | 0 | 0 | 0 | 0 |
| $I_{4,C}$ | ---- $P_{2,3}$ ---- | 0 | 0 | 5 | 0 | 0 | 0 | 8 | $I_{6,C}$ | -------- | 0 | 0 | 5 | 0 | 0 | 0 | 0 |
| $I_{4,D}$ | -------- | 0 | 0 | 5 | 0 | 0 | 0 | 0 | $I_{6,D}$ | -------- | 0 | 0 | 5 | 0 | 0 | 0 | 0 |
| $I_{4,E}$ | -------- | 0 | 0 | 5 | 5 | 0 | 5 | 0 | $I_{6,E}$ | -------- | 0 | 0 | 5 | 5 | 0 | 6 | 0 |
| $I_{4,F}$ | -------- | 0 | 0 | 0 | 0 | 0 | 0 | 0 | $I_{6,F}$ | -------- | 0 | 0 | 0 | 0 | 0 | 0 | 0 |
| $I_{5,0}$ | -------- | 1 | 2 | 0 | 0 | 0 | 0 | 0 | $I_{7,0}$ | -------- | 1 | 1 | 0 | 0 | 0 | 0 | 0 |
| $I_{5,1}$ | -------- | 0 | 0 | 0 | 0 | 0 | 0 | 0 | $I_{7,1}$ | -------- | 0 | 0 | 0 | 0 | 0 | 0 | 0 |
| $I_{5,2}$ | -------- | 0 | 0 | 0 | 0 | 0 | 0 | 0 | $I_{7,2}$ | -------- | 0 | 0 | 0 | 0 | 0 | 0 | 0 |
| $I_{5,3}$ | -------- | 0 | 0 | 1 | 0 | 0 | 0 | 0 | $I_{7,3}$ | -------- | 0 | 0 | 1 | 0 | 0 | 0 | 0 |
| $I_{5,4}$ | -------- | 0 | 0 | 1 | 0 | 0 | 0 | 0 | $I_{7,4}$ | -------- | 0 | 0 | 1 | 0 | 0 | 0 | 0 |
| $I_{5,5}$ | -------- | 0 | 0 | 1 | 0 | 0 | 0 | 0 | $I_{7,5}$ | -------- | 0 | 0 | 1 | 0 | 0 | 0 | 0 |
| $I_{5,6}$ | -------- | 0 | 0 | 1 | 1 | 0 | 1 | 0 | $I_{7,6}$ | -------- | 0 | 0 | 1 | 1 | 0 | 2 | 0 |
| $I_{5,7}$ | -------- | 0 | 0 | 3 | 0 | 0 | 0 | 0 | $I_{7,7}$ | -------- | 0 | 0 | 3 | 0 | 0 | 0 | 0 |
| $I_{5,8}$ | -------- | 0 | 0 | 3 | 0 | 0 | 0 | 0 | $I_{7,8}$ | -------- | 0 | 0 | 3 | 0 | 0 | 0 | 0 |
| $I_{5,9}$ | -------- | 0 | 0 | 3 | 0 | 0 | 0 | 0 | $I_{7,9}$ | -------- | 0 | 0 | 3 | 0 | 0 | 0 | 0 |
| $I_{5,A}$ | -------- | 0 | 0 | 3 | 3 | 0 | 3 | 0 | $I_{7,A}$ | -------- | 0 | 0 | 3 | 3 | 0 | 4 | 0 |
| $I_{5,B}$ | -------- | 0 | 0 | 5 | 0 | 0 | 0 | 0 | $I_{7,B}$ | -------- | 0 | 0 | 5 | 0 | 0 | 0 | 0 |
| $I_{5,C}$ | -------- | 0 | 0 | 5 | 0 | 0 | 0 | 0 | $I_{7,C}$ | -------- | 0 | 0 | 5 | 0 | 0 | 0 | 0 |
| $I_{5,D}$ | -------- | 0 | 0 | 5 | 0 | 0 | 0 | 0 | $I_{7,D}$ | -------- | 0 | 0 | 5 | 0 | 0 | 0 | 0 |
| $I_{5,E}$ | -------- | 0 | 0 | 5 | 5 | 0 | 5 | 0 | $I_{7,E}$ | -------- | 0 | 0 | 5 | 5 | 0 | 6 | 0 |
| $I_{5,F}$ | -------- | 0 | 0 | 0 | 0 | 0 | 0 | 0 | $I_{7,F}$ | -------- | 0 | 0 | 0 | 0 | 0 | 0 | 0 |
| $I_{8,0}$ | ---- $P_{3,0}$ ---- | 1 | 1 | 0 | 0 | 0 | 0 | 1 | $I_{A,0}$ | -------- | 1 | 1 | 0 | 0 | 0 | 0 | 0 |
| $I_{8,1}$ | -------- | 0 | 0 | 0 | 0 | 0 | 0 | 0 | $I_{A,1}$ | -------- | 0 | 0 | 0 | 0 | 0 | 0 | 0 |
| $I_{8,2}$ | -------- | 0 | 0 | 0 | 0 | 0 | 0 | 0 | $I_{A,2}$ | -------- | 0 | 0 | 0 | 0 | 0 | 0 | 0 |
| $I_{8,3}$ | -------- | 0 | 0 | 1 | 0 | 0 | 0 | 0 | $I_{A,3}$ | -------- | 0 | 0 | 1 | 0 | 0 | 0 | 0 |
| $I_{8,4}$ | ---- $P_{3,1}$ ---- | 0 | 0 | 1 | 0 | 0 | 0 | 3 | $I_{A,4}$ | -------- | 0 | 0 | 1 | 0 | 0 | 0 | 0 |
| $I_{8,5}$ | -------- | 0 | 0 | 1 | 0 | 0 | 0 | 0 | $I_{A,5}$ | -------- | 0 | 0 | 1 | 0 | 0 | 0 | 0 |
| $I_{8,6}$ | -------- | 0 | 0 | 1 | 1 | 0 | 2 | 0 | $I_{A,6}$ | -------- | 0 | 0 | 1 | 1 | 0 | 1 | 0 |
| $I_{8,7}$ | -------- | 0 | 0 | 3 | 0 | 0 | 0 | 0 | $I_{A,7}$ | -------- | 0 | 0 | 3 | 0 | 0 | 0 | 0 |
| $I_{8,8}$ | ---- $P_{3,2}$ ---- | 0 | 0 | 3 | 0 | 0 | 0 | 5 | $I_{A,8}$ | -------- | 0 | 0 | 3 | 0 | 0 | 0 | 0 |
| $I_{8,9}$ | -------- | 0 | 0 | 3 | 0 | 0 | 0 | 0 | $I_{A,9}$ | -------- | 0 | 0 | 3 | 0 | 0 | 0 | 0 |
| $I_{8,A}$ | -------- | 0 | 0 | 3 | 3 | 0 | 4 | 0 | $I_{A,A}$ | -------- | 0 | 0 | 3 | 3 | 0 | 3 | 0 |
| $I_{8,B}$ | -------- | 0 | 0 | 5 | 0 | 0 | 0 | 0 | $I_{A,B}$ | -------- | 0 | 0 | 5 | 0 | 0 | 0 | 0 |
| $I_{8,C}$ | ---- $P_{3,3}$ ---- | 0 | 0 | 5 | 0 | 0 | 0 | 7 | $I_{A,C}$ | -------- | 0 | 0 | 5 | 0 | 0 | 0 | 0 |
| $I_{8,D}$ | -------- | 0 | 0 | 5 | 0 | 0 | 0 | 0 | $I_{A,D}$ | -------- | 0 | 0 | 5 | 0 | 0 | 0 | 0 |
| $I_{8,E}$ | -------- | 0 | 0 | 5 | 5 | 0 | 6 | 0 | $I_{A,E}$ | -------- | 0 | 0 | 5 | 5 | 0 | 5 | 0 |
| $I_{8,F}$ | -------- | 0 | 0 | 0 | 0 | 0 | 0 | 0 | $I_{A,F}$ | -------- | 0 | 0 | 0 | 0 | 0 | 0 | 0 |
| $I_{9,0}$ | -------- | 1 | 1 | 0 | 0 | 0 | 0 | 0 | $I_{B,0}$ | -------- | 1 | 2 | 0 | 0 | 0 | 0 | 0 |
| $I_{9,1}$ | -------- | 0 | 0 | 0 | 0 | 0 | 0 | 0 | $I_{B,1}$ | -------- | 0 | 0 | 0 | 0 | 0 | 0 | 0 |
| $I_{9,2}$ | -------- | 0 | 0 | 0 | 0 | 0 | 0 | 0 | $I_{B,2}$ | -------- | 0 | 0 | 0 | 0 | 0 | 0 | 0 |
| $I_{9,3}$ | -------- | 0 | 0 | 1 | 0 | 0 | 0 | 0 | $I_{B,3}$ | -------- | 0 | 0 | 1 | 0 | 0 | 0 | 0 |
| $I_{9,4}$ | -------- | 0 | 0 | 1 | 0 | 0 | 0 | 0 | $I_{B,4}$ | -------- | 0 | 0 | 1 | 0 | 0 | 0 | 0 |
| $I_{9,5}$ | -------- | 0 | 0 | 1 | 0 | 0 | 0 | 0 | $I_{B,5}$ | -------- | 0 | 0 | 1 | 0 | 0 | 0 | 0 |
| $I_{9,6}$ | -------- | 0 | 0 | 1 | 1 | 0 | 2 | 0 | $I_{B,6}$ | -------- | 0 | 0 | 1 | 1 | 0 | 1 | 0 |
| $I_{9,7}$ | -------- | 0 | 0 | 3 | 0 | 0 | 0 | 0 | $I_{B,7}$ | -------- | 0 | 0 | 3 | 0 | 0 | 0 | 0 |
| $I_{9,8}$ | -------- | 0 | 0 | 3 | 0 | 0 | 0 | 0 | $I_{B,8}$ | -------- | 0 | 0 | 3 | 0 | 0 | 0 | 0 |
| $I_{9,9}$ | -------- | 0 | 0 | 3 | 0 | 0 | 0 | 0 | $I_{B,9}$ | -------- | 0 | 0 | 3 | 0 | 0 | 0 | 0 |

TABLE 1-continued

| OUTPUT PIXEL ($I_M$) $I_{ROW,COL}$ | INPUT PIXEL | \multicolumn{7}{c}{POSITIONS OF SWITCHES} | OUTPUT PIXEL ($I_m$) $I_{ROW,COL}$ | INPUT PIXEL | \multicolumn{7}{c}{POSITIONS OF SWITCHES} |
|---|---|---|---|---|---|---|---|---|---|---|---|---|---|---|---|
| | | J | K | L | M | N | P | Q | | | J | K | L | M | N | P | Q |
| $I_{9,A}$ | -------- | 0 | 0 | 3 | 3 | 0 | 4 | 0 | $I_{B,A}$ | -------- | 0 | 0 | 3 | 3 | 0 | 3 | 0 |
| $I_{9,B}$ | -------- | 0 | 0 | 5 | 0 | 0 | 0 | 0 | $I_{B,B}$ | -------- | 0 | 0 | 5 | 0 | 0 | 0 | 0 |
| $I_{9,C}$ | -------- | 0 | 0 | 5 | 0 | 0 | 0 | 0 | $I_{B,C}$ | -------- | 0 | 0 | 5 | 0 | 0 | 0 | 0 |
| $I_{9,D}$ | -------- | 0 | 0 | 5 | 0 | 0 | 0 | 0 | $I_{B,D}$ | -------- | 0 | 0 | 5 | 0 | 0 | 0 | 0 |
| $I_{9,E}$ | -------- | 0 | 0 | 5 | 5 | 0 | 6 | 0 | $I_{B,E}$ | -------- | 0 | 0 | 5 | 5 | 0 | 5 | 0 |
| $I_{9,F}$ | -------- | 0 | 0 | 0 | 0 | 0 | 0 | 0 | $I_{B,F}$ | -------- | 0 | 0 | 0 | 0 | 0 | 0 | 0 |
| $I_{C,0}$ | ---- $P_{0,0}$ ---- | 1 | 2 | 0 | 0 | 0 | 0 | 9 | $I_{E,0}$ | -------- | 1 | 2 | 0 | 0 | 0 | 0 | 0 |
| $I_{C,1}$ | -------- | 0 | 0 | 0 | 0 | 0 | 0 | 0 | $I_{E,1}$ | -------- | 0 | 0 | 0 | 0 | 0 | 0 | 0 |
| $I_{C,2}$ | -------- | 0 | 0 | 0 | 0 | 0 | 0 | 0 | $I_{E,2}$ | -------- | 0 | 0 | 0 | 0 | 0 | 0 | 0 |
| $I_{C,3}$ | -------- | 0 | 0 | 1 | 0 | 0 | 0 | 0 | $I_{E,3}$ | -------- | 0 | 0 | 1 | 0 | 0 | 0 | 0 |
| $I_{C,4}$ | ---- $P_{0,1}$ ---- | 0 | 0 | 1 | 2 | 1 | 0 | 0 | $I_{E,4}$ | -------- | 0 | 0 | 1 | 0 | 0 | 0 | 0 |
| $I_{C,5}$ | -------- | 0 | 0 | 1 | 0 | 0 | 0 | 0 | $I_{E,5}$ | -------- | 0 | 0 | 1 | 0 | 0 | 0 | 0 |
| $I_{C,6}$ | -------- | 0 | 0 | 1 | 1 | 0 | 1 | 0 | $I_{E,6}$ | -------- | 0 | 0 | 1 | 0 | 0 | 0 | 0 |
| $I_{C,7}$ | -------- | 0 | 0 | 3 | 0 | 0 | 0 | 0 | $I_{E,7}$ | -------- | 0 | 0 | 3 | 0 | 0 | 0 | 0 |
| $I_{C,8}$ | ---- $P_{0,2}$ ---- | 0 | 0 | 3 | 4 | 1 | 0 | 0 | $I_{E,8}$ | -------- | 0 | 0 | 3 | 0 | 0 | 0 | 0 |
| $I_{C,9}$ | -------- | 0 | 0 | 3 | 0 | 0 | 0 | 0 | $I_{E,9}$ | -------- | 0 | 0 | 3 | 0 | 0 | 0 | 0 |
| $I_{C,A}$ | -------- | 0 | 0 | 3 | 3 | 0 | 3 | 0 | $I_{E,A}$ | -------- | 0 | 0 | 3 | 0 | 0 | 0 | 0 |
| $I_{C,B}$ | -------- | 0 | 0 | 5 | 0 | 0 | 0 | 0 | $I_{E,B}$ | -------- | 0 | 0 | 5 | 0 | 0 | 0 | 0 |
| $I_{C,C}$ | ---- $P_{0,3}$ ---- | 0 | 0 | 5 | 6 | 1 | 0 | 0 | $I_{E,C}$ | -------- | 0 | 0 | 5 | 0 | 0 | 0 | 0 |
| $I_{C,D}$ | -------- | 0 | 0 | 5 | 0 | 0 | 0 | 0 | $I_{E,D}$ | -------- | 0 | 0 | 5 | 0 | 0 | 0 | 0 |
| $I_{C,E}$ | -------- | 0 | 0 | 5 | 5 | 0 | 5 | 0 | $I_{E,E}$ | -------- | 0 | 0 | 5 | 0 | 0 | 0 | 0 |
| $I_{C,F}$ | -------- | 0 | 0 | 0 | 0 | 0 | 0 | 0 | $I_{E,F}$ | -------- | 0 | 0 | 0 | 0 | 0 | 0 | 0 |
| $I_{D,0}$ | -------- | 1 | 2 | 0 | 0 | 0 | 0 | 0 | $I_{F,0}$ | -------- | 1 | 0 | 0 | 0 | 0 | 0 | 0 |
| $I_{D,1}$ | -------- | 0 | 0 | 0 | 0 | 0 | 0 | 0 | $I_{F,1}$ | -------- | 0 | 0 | 0 | 0 | 0 | 0 | 0 |
| $I_{D,2}$ | -------- | 0 | 0 | 0 | 0 | 0 | 0 | 0 | $I_{F,2}$ | -------- | 0 | 0 | 0 | 0 | 0 | 0 | 0 |
| $I_{D,3}$ | -------- | 0 | 0 | 1 | 0 | 0 | 0 | 0 | $I_{F,3}$ | -------- | 0 | 0 | 1 | 0 | 0 | 0 | 0 |
| $I_{D,4}$ | -------- | 0 | 0 | 1 | 0 | 0 | 0 | 0 | $I_{F,4}$ | -------- | 0 | 0 | 1 | 0 | 0 | 0 | 0 |
| $I_{D,5}$ | -------- | 0 | 0 | 1 | 0 | 0 | 0 | 0 | $I_{F,5}$ | -------- | 0 | 0 | 1 | 0 | 0 | 0 | 0 |
| $I_{D,6}$ | -------- | 0 | 0 | 1 | 1 | 0 | 1 | 0 | $I_{F,6}$ | -------- | 0 | 0 | 1 | 0 | 0 | 0 | 0 |
| $I_{D,7}$ | -------- | 0 | 0 | 3 | 0 | 0 | 0 | 0 | $I_{F,7}$ | -------- | 0 | 0 | 3 | 0 | 0 | 0 | 0 |
| $I_{D,8}$ | -------- | 0 | 0 | 3 | 0 | 0 | 0 | 0 | $I_{F,8}$ | -------- | 0 | 0 | 3 | 0 | 0 | 0 | 0 |
| $I_{D,9}$ | -------- | 0 | 0 | 3 | 0 | 0 | 0 | 0 | $I_{F,9}$ | -------- | 0 | 0 | 3 | 0 | 0 | 0 | 0 |
| $I_{D,A}$ | -------- | 0 | 0 | 3 | 3 | 0 | 3 | 0 | $I_{F,A}$ | -------- | 0 | 0 | 3 | 0 | 0 | 0 | 0 |
| $I_{D,B}$ | -------- | 0 | 0 | 5 | 0 | 0 | 0 | 0 | $I_{F,B}$ | -------- | 0 | 0 | 5 | 0 | 0 | 0 | 0 |
| $I_{D,C}$ | -------- | 0 | 0 | 5 | 0 | 0 | 0 | 0 | $I_{F,C}$ | -------- | 0 | 0 | 5 | 0 | 0 | 0 | 0 |
| $I_{D,D}$ | -------- | 0 | 0 | 5 | 0 | 0 | 0 | 0 | $I_{F,D}$ | -------- | 0 | 0 | 5 | 0 | 0 | 0 | 0 |
| $I_{D,E}$ | -------- | 0 | 0 | 5 | 5 | 0 | 5 | 0 | $I_{F,E}$ | -------- | 0 | 0 | 5 | 0 | 0 | 0 | 0 |
| $I_{D,F}$ | -------- | 0 | 0 | 0 | 0 | 0 | 0 | 0 | $I_{F,F}$ | -------- | 0 | 0 | 0 | 0 | 0 | 0 | 0 |

The spatial toner of FIG. 7 reconstitutes or shades in the picture illustrated in FIG. 1 by computing the intensity points (I's) in a raster scan fashion from the received pixels (P's). To aid in understanding how this computing operation is performed, FIG. 7 can be divided into the following functional units:

1. An input circuit comprised of a horizontal gradient generator 21 serially coupled to a vertical gradient generator 23.

The horizontal gradient generator 21 uses adjacent horizontal pairs of the received pixels to generate horizontal gradient information for the top part of the frame or picture of FIG. 1.

The vertical gradient generator 23 uses adjacent vertical pairs of the received pixels to generate vertical gradient information for the left-hand side of the frame or picture of FIG. 1.

2. Horizontal gradient (H.G.) registers 31-36 comprised of working (WKG) registers 31, 33 and 35 for macro columns (MC's) 1, 2 and 3, respectively, and of initial condition (IC) registers 32, 34 and 36 for macro columns (MC's) 1, 2 and 3, respectively.

The horizontal gradient IC registers 32, 34 and 36 selectively store the horizontal gradient information that is generated by the horizontal gradient generator 21 for the upper boundaries of macro columns 1, 2 and 3.

3. Multi-position switches (SW) J, K, L, M, N, P and Q, which have their respective switch positions controlled by the instruction set from the ROM 19. These switches may be electronic switches or suitable multiplexing devices.

4. A frame initial condition circuit which comprises a multiply-by-four ($\times 4$) circuit 40 serially coupled to a frame initial condition (IC) register 41.

As shown in FIG. 7, the $\times 4$ circuit 40 is also coupled in series with the $\div 4$ circuit 29 in vertical gradient generator 23 when switch Q is in position 9. By including the $\times 4$ circuit 40 in series with the $\div 4$ circuit 29, the amplitude of received pixel $P_{0,0}$ is essentially unchanged. The $\times 4$ circuit 40 multiplies the data applied thereto ($P_{0,0}/4$) by 4 by merely left-shifting the data two bit-places.

Frame IC register 41 stores $P_{0,0}$ as the initial intensity ($I_{0,0}$) condition for a new frame or picture.

5. Vertical gradient (V.G.) registers 43 and 45. Register 43 is the V.G. register for odd macro rows (MR's) and register 45 is the V.G. register for even macro rows (MR's).

Vertical gradient registers 43 and 45 selectively store the vertical gradient information that is generated by the vertical gradient generator 23 for the left-hand side of a frame or picture.

6. A two dimensional gradient generator comprised of two-dimensional gradient (2 DG) registers 51-56 and a divide-by-four ($\div 4$) circuit 57.

Registers 51-56 selectively store the two dimensional gradient information (e.g. $(I_1 - I_2 - I_3 + I_4)/4$ that is generated by the vertical gradient generator 23. Registers 51, 53 and 55 store information for the macro cells in odd-numbered macro rows (MR's) of macro columns (MC's) 1, 2 and 3, respectively. Registers 52, 54 and 56 store information for the macro cells in even-numbered macro rows (MR's) of macro columns (MC's) 1, 2 and 3, respectively.

The $\div 4$ circuit 57, which is similar to the $\div 4$ circuits 26 and 29, is used to convert the two-dimensional gradient information that is selectively received from registers 51–56 into two dimensional gradients (e.g., $(I_1-I_2-I_3+I_4)/4^2$). The two-dimensional gradients from the $\div 4$ circuit 57 are selectively used to update the horizontal gradients stored in the registers 31, 33 and 35, whenever a different horizontal line of intensity points is being generated.

7. Line initial condition (IC) accumulator 61, comprised of the combination of a register 63, coupled between a first input and the output of a summer or combiner 65.

The line IC accumulator 61 generates the initial intensity of a row or line by incrementing the initial intensity of the previous row or line by the associated vertical gradient along the left-hand side of the frame or picture.

8. Horizontal gradient (H.G.) accumulator 67, comprised of the combination of a register 69 coupled between a first input and the output of a summer or combiner 71.

The H.G. accumulator 67 generates the proper intensity for an output pixel ($I_M$) by incrementing the stored intensity of the previous output pixel by the associated horizontal gradient.

9. A summer or combiner 59 for summing two-dimensional gradients from the $\div 4$ circuit 57 with the horizontal gradient information from switch L in order to update the horizontal gradients for the following line of intensity points.

In the further discussion of the structure and operation of the spatial toner system of FIG. 7, FIGS. 1 and 2 and TABLE 1 will be selectively referred to. TABLE 1 specifically shows the steady state cyclic operation of the switches J, K, L, M, N, P and Q for enabling the system to generate (in a raster scan fashion) sequential frames of output pixels $I_{0,0} \ldots I_{F,F}$ (indicated in FIG. 1) relative to the times that the received pixels $P_{0,0} \ldots P_{3,3}$ are strobed out of the FIFO 15.

The horizontal gradient generator 21 is coupled between the output of the FIFO 15 and position 1 of switch N. The generator 21 comprises a delay register 24 coupled between the positive and negative inputs of a subtractor or combiner 25, with the output of the subtractor being coupled to a divide-by-four ($\div 4$) circuit 26. Delay register 24 is reset (by, for example the first, fifth, ninth and thirteenth strobe pulses out of the ROM 19) to a "zero" initial condition (I.C.) at the start of each of the four FIFO 15 output lines or rows of received pixels (e.g. $P_{0,0} \ldots P_{0,3}$; $P_{1,0} \ldots P_{1,3}$; $P_{2,0} \ldots P_{2,3}$; $P_{3,0} \ldots P_{3,3}$). Register 24 has a delay time equal to the time between a pair of adjacent received pixels from the FIFO 15 in a horizontal line (e.g. the time between the pair of received pixels $P_{0,0}$ and $P_{0,1}$ in horizontal row or line 2 of FIG. 1). In this manner the intensity difference between adjacent horizontal pixels in row 2 (e.g., $P_{0,1}-P_{0,0}$, $P_{0,2}-P_{0,1}$, $P_{0,3}-P_{0,2}$) is developed at the output of the subtractor 25. Since, as shown in FIG. 1, there are 4 increments between, for example, adjacent horizontal pixels $P_{0,0}$ and $P_{0,1}$, the $\div 4$ circuit 26 develops the horizontal gradient between each pair of adjacent received pixels $(P_{0,1}-P_{0,0})/4$, $(P_{0,2}-P_{0,1})/4$ and $(P_{0,3}-P_{0,2})/4$ across the top edge (of each of rows or lines 0, 1 and 2) of the picture of FIG. 1. The circuit 26 provides a division by 4 by merely right-shifting the amplitude difference from subtractor 25 by two bit-places.

The vertical gradient generator 23 is coupled between the output of subtractor 25 and the movable pole of switch Q. The generator 23 comprises a delay register 27 coupled between the positive and negative inputs of a subtractor or combiner 28, with the output of the subtractor 28 being coupled to a divide-by-four ($\div 4$) circuit 29. Delay register 27 is reset (by, for example, the first strobe pulse out of the ROM 19) to a "zero" initial condition (I.C.) at the start of each frame output from the FIFO 15 (at the time $P_{0,0}$ is strobed out of the FIFO 15). Register 27 has a 4-line (or 4 row) delay time equal to the time between received pixels from the FIFO 15 in a vertical column of FIG. 1. For example, a 4-line delay time exists between received pixel $P_{0,0}$ (in row 2) and received pixel $P_{1,0}$ (in row 6) of FIG. 1. In this manner, the intensity difference between adjacent vertical pixels in column 2 (e.g., $P_{1,0}-P_{0,0}$, $P_{2,1}-P_{1,0}$, $P_{3,0}-P_{2,0}$) is developed at the output of the subtractor 28. Since, as shown in FIG. 1, there are 4 increments between, for example, adjacent vertical pixels $P_{0,0}$ and $P_{1,0}$, the $\div 4$ circuit 29 develops the vertical gradient between each pair of adjacent received pixels $(P_{1,0}-P_{0,0})/4$, $(P_{2,0}-P_{1,0})/4$, $(P_{3,0}-P_{2,0})/4$ along the left-hand side (of each of columns 0, 1 and 2) of the picture of FIG. 1. The circuit 29 provides a division by 4 by merely right-shifting the amplitude difference from subtractor 28 by two bit-places.

Vertical gradient generator 23 also provides two-dimensional gradient information (e.g., $(I_1-I_2-I_3+I_4)/4$) from which two-dimensional gradients (e.g., $(I_1-I_2-I_3+I_4)/4^2$ of equation (4)) are derived to update the horizontal gradients (developed by generator 21) whenever a different horizontal line of intensity points is to be generated.

It has been previously assumed, as well as shown in FIGS. 1 and 2, that there are 4 horizontal and 4 vertical increments in each of the macro cells $C_{1,1} \ldots C_{3,3}$. If more horizontal and vertical increments were desired in each macro cell, then more intensity points would have to be computed between each of the horizontal and vertical pairs of adjacent received pixels (P's). As a consequence, each of the circuits 26 and 29 would have to perform a larger division of the amplitude of input data. For example, if 8 increments (instead of 4) were used between adjacent received horizontal pixels (e.g. $P_{0,0}$ and $P_{0,1}$) and between adjacent received vertical pixels (e.g. $P_{0,0}$ and $P_{1,0}$), the circuits 26 and 29 would have to be divide-by-eight ($\div 8$) circuits in order to respectively develop the proper horizontal and vertical gradients. In the event that the circuits 26 and 29 were $\div 8$ circuits, the multiplier 40 would have to be a multiply-by-eight ($\times 8$) circuit. Division by a $\div 8$ circuit would result by merely right-shifting input data amplitude three bit-places, while multiplication by a $\times 8$ circuit would result by merely left-shifting input data amplitude three bit-places.

The selective utilization of the input pixels ($P_{0,0} \ldots P_{3,3}$) by the system of FIG. 7 to generate and store the initial frame intensity ($I_{0,0}$), the horizontal gradients across the tops of the exemplary macro columns (1, 2 and 3), the vertical gradients along the extreme left-hand sides of the exemplary macro rows (1, 2 and 3), and the two dimensional gradient (2 DG) information for the exemplary macro cells ($C_{1,1} \ldots C_{3,3}$) will now be discussed.

The first pixel $P_{0,0}$ being strobed out of the FIFO 15 is applied to the inputs of the delay register 24 and the subtractor 25 in the horizontal gradient generator 21. As indicated before, delay register 24 is reset to zero before the start of each line and delay register 27 is reset to zero at the start of a frame. Thus, at the time of pixel $P_{0,0}$ there is no output of the delay register 24 being applied to the subtractor 25 and no output of the delay register 27 being applied to the subtractor 28. As a result, pixel $P_{0,0}$ is passed directly through subtractors 25 and 28, ÷4 circuit 29, position 9 of switch Q (see TABLE 1), ×4 circuit 40 and stored in frame IC register 41. By including the ×4 circuit 40 in series with the ÷4 circuit 29, the amplitude of pixel $P_{0,0}$ is essentially unchanged.

At the time that pixel $P_{0,1}$ is strobed out of the FIFO 15 and applied to the inputs of delay register 24 and subtractor 25, the first pixel $P_{0,0}$ is being applied from the output of register 24 to the subtracting input of subtractor 25. Thus, at the time of $P_{0,1}$ the output of the ÷4 circuit 26 is the horizontal gradient $(P_{0,1}-P_{0,0})/4$ across the top of macro cell $C_{1,1}$. This horizontal gradient $(P_{0,1}-P_{0,0})/4$, as shown in TABLE 1, is applied through position 1 of switch N, position 2 of switch M and stored in register 32. Register 32 is used to store the initial condition (IC) of the horizontal gradient for macro column (MC) 1. In a like manner, at the time of $P_{0,2}$, the horizontal gradient $(P_{0,2}-P_{0,1})/4$ across the top of macro cell $C_{1,2}$ is generated by horizontal gradient generator 21, applied through position 1 of switch N and position 4 of switch M, and stored in register 34. Similarly, at the time of $P_{0,3}$, the horizontal gradient $(P_{0,3}-P_{0,2})/4$ across the top of macro cell $C_{1,3}$ is developed by generator 21, passed through position 1 of switch N and position 6 of switch M, and stored in register 36. Registers 34 and 36 are used to selectively store the initial conditions of the horizontal gradients for macro columns 2 and 3, respectively.

It will be recalled that register 24 is reset to zero before the start of each line of FIG. 1. Therefore, as shown in FIG. 1 and TABLE 1, $P_{1,0}$ is passed from FIFO 15 through subtractor 25 to subtractor 28 at the same time that $P_{0,0}$ is applied from the output of the 4-line delay register 27 to the subtracting input of subtractor 28. As a result, at the time of $P_{1,0}$ the output of ÷4 circuit 29 in vertical gradient generator 23 is the vertical gradient $(P_{1,0}-P_{0,0})/4$ along the left-hand side of macro cell $C_{1,1}$. This vertical gradient $(P_{1,0}-P_{0,0})/4$, as shown in TABLE 1, is applied through position 1 of switch Q and stored in vertical gradient register 43. Register 43 is used to sequentially store the vertical gradient along the left-hand side of each of the odd-numbered macro rows (1 and 3 in this exemplary description).

At the time of $P_{1,1}$, the output of subtractor 25 in horizontal gradient generator 21 is $(P_{1,1}-P_{1,0})$ and the output of delay register 27, which is applied to the subtracting input of subtractor 28 in vertical gradient generator 23, is $(P_{0,1}-P_{0,0})$ (which has been delayed by 4 lines). Therefore, at the time of $P_{1,1}$ the output of the ÷4 circuit 29 is the two-dimensional gradient (2 DG) information $(P_{0,0}-P_{0,1}-P_{1,0}+P_{1,1})/4$ for macro cell $C_{1,1}$. As shown in TABLE 1, this 2 DG information for macro cell $C_{1,1}$ is applied through position 3 of switch Q and stored in 2 DG register 51. Register 51 is used to selectively store the 2 DG information for the macro cells in the odd macro rows (MR's) in macro column (MC) 1. In a like manner, after $P_{1,2}$ is strobed out of FIFO 15, 2 DG information $(P_{0,1}-P_{0,2}-P_{1,1}+P_{1,2})/4$ for macro cell $C_{1,2}$ is developed by vertical gradient generator 23, passed through position 5 of switch Q and stored in 2 DG register 53. Register 53 is used to selectively store the 2 DG information for the macro cells in the odd macro rows (MR's) in macro column (MC) 2. Similarly, at the time of $P_{1,3}$, 2 DG information $(P_{0,2}-P_{0,3}-P_{1,2}+P_{1,3})/4$ for macro cell $C_{1,3}$ is developed by vertical gradient generator 23, passed through position 7 of switch Q and stored in 2 DG register 55. Register 55 is used to selectively store the 2 DG information for the macro cells in the odd macro rows (MR's) in macro column (MC) 3.

TABLE 1 and FIGS. 1, 2 and 7 likewise indicate that at the respective times that $P_{2,0}$, $P_{2,1}$, $P_{2,2}$ and $P_{2,3}$ are sequentially strobed out of the FIFO 15, the vertical gradient along the left-hand side of macro cell $C_{2,1}$ and the 2 DG information signals for macro cells $C_{2,1}$, $C_{2,2}$ and $C_{2,3}$ are selectively generated by the vertical gradient generator 23 and respectively stored in registers 45, 52, 54 and 56 (by way of the respective switch Q positions 2, 4, 6 and 8). It should be noted that when switch Q is in its 0 position, no data is being loaded into any of the registers 41, 43, 45 and 51–56.

Register 45 is used to selectively store the vertical gradient along the left-hand side of each of the even-numbered macro rows (2 in this exemplary description). Registers 52, 54 and 56 are used to selectively store the 2 DG information signals for the macro cells in the even macro rows in macro columns 1, 2 and 3 (i.e. $C_{2,1}$, $C_{2,2}$ and $C_{2,3}$ in this exemplary description).

Similarly, at the times that the input pixels $P_{3,0}$, $P_{3,1}$, $P_{3,2}$ and $P_{3,3}$ are sequentially strobed out of the FIFO 15, the vertical gradient along the left-hand side of macro cell $C_{3,1}$ and the 2 DG information signals for macro cells $C_{3,1}$, $C_{3,2}$ and $C_{3,3}$ are selectively generated by the vertical gradient generator 23 and respectively stored in VG register 43 and 2 DG registers 51, 53 and 55 (by way of the respective switch Q positions 1, 3, 5 and 7).

As discussed above, the selective utilization of the input pixels ($P_{0,0}$ ... $P_{3,3}$) by the system of FIG. 7 to generate and store the initial frame intensity ($I_{0,0}$), the horizontal gradients across the tops of macro columns 1, 2 and 3, the vertical gradients along the left-hand sides of macro rows 1, 2 and 3, and the 2 D gradient information for macro cells $C_{1,1}$ ... $C_{3,3}$ is summarized in the following TABLE 2.

TABLE 2

| Output Pixel | Input Pixel | ÷ 4 Circuit 26 | | ÷ 4 Circuit 29 | |
|---|---|---|---|---|---|
| | | Output | Stored In | Output | Stored In |
| $I_{C,0}$ | $P_{0,0}$ | $P_{0,0}$ only | | $P_{0,0}$ only | Register 41 |
| $I_{C,4}$ | $P_{0,1}$ | Horiz. grad. across top of MC #1 (Cell $C_{1,1}$) | Register 32 | | |
| $I_{C,8}$ | $P_{0,2}$ | Horiz. grad. across top of MC #2 (Cell $C_{1,2}$) | Register 34 | | |
| $I_{C,C}$ | $P_{0,3}$ | Horiz. grad. across top of MC #3 (Cell $C_{1,3}$) | Register 36 | | |

TABLE 2-continued

| Output Pixel | Input Pixel | ÷ 4 Circuit 26 | | ÷ 4 Circuit 29 | |
|---|---|---|---|---|---|
| | | Output | Stored In | Output | Stored In |
| $I_{0,0}$ | $P_{1,0}$ | $P_{1,0}$ only | | Vert. grad. of left-hand side of MR #1 | Register 43 |
| $I_{0,4}$ | $P_{1,1}$ | Horiz. grad. across bottom of Cell $C_{1,1}$ | | 2 D grad. info. in Cell $C_{1,1}$ | Register 51 |
| $I_{0,8}$ | $P_{1,2}$ | Horiz. grad. across bottom of Cell $C_{1,2}$ | | 2 D grad. info. in Cell $C_{1,2}$ | Register 53 |
| $I_{0,C}$ | $P_{1,3}$ | Horiz. grad. across bottom of Cell $C_{1,3}$ | | 2 D grad. info. in Cell $C_{1,3}$ | Register 55 |
| $I_{4,0}$ | $P_{2,0}$ | $P_{2,0}$ only | | Vert. grad. of left-hand side of MR #2 | Register 45 |
| $I_{4,4}$ | $P_{2,1}$ | Horiz. grad. across bottom of Cell $C_{2,1}$ | | 2 D grad. info. in Cell $C_{2,1}$ | Register 52 |
| $I_{4,8}$ | $P_{2,2}$ | Horiz. grad. across bottom of Cell $C_{2,2}$ | | 2 D grad. info. in Cell $C_{2,2}$ | Register 54 |
| $I_{4,C}$ | $P_{2,3}$ | Horiz. grad. across bottom of Cell $C_{2,3}$ | | 2 D grad. info. in Cell $C_{2,3}$ | Register 56 |
| $I_{8,0}$ | $P_{3,0}$ | $P_{3,0}$ only | | Vert. grad. of left-hand side of MR #3 | Register 43 |
| $I_{8,4}$ | $P_{3,1}$ | Horiz. grad. across bottom of Cell $C_{3,1}$ | | 2 D grad. info. in Cell $C_{3,1}$ | Register 51 |
| $I_{8,8}$ | $P_{3,2}$ | Horiz. grad. across bottom of Cell $C_{3,2}$ | | 2 D grad. info. in Cell $C_{3,2}$ | Register 53 |
| $I_{8,C}$ | $P_{3,3}$ | Horiz. grad. across bottom of Cell $C_{3,3}$ | | 2 D grad. info. in Cell $C_{3,3}$ | Register 55 |

The generation of the initial intensity conditions for the lines or rows 0, 1 ... 9, A ... F of FIG. 1 will now be discussed. These initial intensity conditions are developed by line IC accumulator 61 from the information stored in registers 41, 43 and 45.

The initial intensity for the first line or row (row 0), and hence for the entire frame or picture (FIG. 1), is the intensity of the first received pixel $P_{0,0}$, which is stored in frame initial condition (IC) register 41. As indicated before, delay register 24 is zeroed at the start of each FIFO 15 output line, and delay register 27 is zeroed at the start of the FIFO 15 output frame. Thus, as shown in FIG. 1 and TABLE 1, the first received pixel $P_{0,0}$ (which is the initial intensity for the next frame) is passed directly through subtractors 25 and 28, ÷4 circuit 29, position 9 of switch Q, ÷4 circuit 40 and stored in frame IC register 41 at the same time that output pixel $I_{C,O}$ is being generated for the present frame. As shown in TABLE 1 and FIG. 7, there is a time delay between the times of reception and utilization of an input pixel to generate an associated output pixel for each of the received pixels. By including the ×4 circuit 40 in series with the ÷4 circuit 29, the intensity amplitude of pixel $P_{0,0}$ is essentially unchanged.

When the system of FIG. 7 is ready to start using $P_{0,0}$, $P_{0,0}$ is passed through position 3 of switch K and stored in the line IC accumulator 61. As stated before the line IC accumulator 61 is comprised of the parallel-coupled register 63 and summer 65. In operation, the register 63 is reset to a "zero" initial condition at the start of the I frame output (before $P_{0,0}$ is developed as the first output pixel $I_{0,0}$ in the frame). At the same time that $P_{0,0}$ is stored in the accumulator, $P_{0,0}$ is also passed out of the accumulator 61, through position 1 of switch J into the H.G. accumulator 67.

At the beginning of each new line or row of FIG. 1, the initial intensity of the previous line must be updated to determine the initial intensity for a new line. As discussed above, there is a zero (0) vertical gradient between lines 0 and 1, and between lines 1 and 2. The initial intensity of line 1 is derived by updating the initial intensity of line 0 ($I_{0,0}$). This updating operation entails adding a 0 vertical gradient from grounded position 0 of switch K to the initial intensity of line 0 ($I_{0,0}$) that was stored in the accumulator 61. In a like manner, the initial condition of line 2 is derived by updating the initial intensity of line 1, by adding the 0 vertical gradient from position 0 of switch K to the initial intensity of line 1 that was stored in the accumulator 61. Hence, the initial intensity for each of lines 1 and 2 is the same as it was for line 0, namely $I_{0,0}$, the initial intensity for the frame.

For the start of line 3, the initial intensity of line 2 is updated or incremented by the vertical gradient information for the extreme left-hand side of macro row 1. It should be recalled that the vertical gradient for the odd macro rows (1 and 3) on the left-hand side of the picture is selectively stored in V.G. register 43, while the vertical gradient for the even macro rows on the left-hand side of the picture is selectively stored in V.G. register 45. By simultaneously examining TABLE 1 and FIG. 7, it can be seen that the intensity information stored in the line IC accumulator 61 is incremented by the vertical gradient applied from register 43 (through position 2 of switch K) at the start of each of lines 3, 4, 5 and 6 in macro row 1; by the vertical gradient applied from register 45 (through position 1 of switch K) at the start of each of lines 7, 8, 9 and A in macro row 2; and by the vertical gradient applied from register 43 (through position 2 of switch K) at the start of each of lines B, C, D and E in macro row 3. Since there also is zero (0) vertical gradient between lines E and F, line F has the same initial intensity as line E had, namely that of $I_{E,O}$. When switch K is in position 0, the line initial intensity information stored in accumulator 61 remains unchanged, since that initial intensity information is incremented by the 0 vertical gradient from position 0 of switch K.

In the above manner, each line of computed intensity points will always be started with the proper intensity. This vertical gradient updating operation for incrementing the initial intensity of the previous line by the vertical gradient along the left-hand side of the picture is shown in equation (6). Thus, as discussed before, the initial (vertical gradient) conditions of macro column 0 for equation (6) are found in registers 43 and 45.

Each of the initial intensities ($I_{0,0}$, $I_{1,0}$, $I_{2,0}$, $I_{3,0}$, $I_{4,0}$, $I_{5,0}$, $I_{6,0}$, $I_{7,0}$, $I_{8,0}$, $I_{9,0}$, $I_{A,0}$, $I_{B,0}$, $I_{C,0}$, $I_{D,0}$, $I_{E,0}$ and $I_{F,0}$)

developed in line IC accumulator 61 for lines 0, 1 ... 9, A ... F is selectively passed through position 1 of switch J into the H.G. accumulator 69. At all other times switch J is in position 0 to enable the H.G. accumulator 69 to increment the initial line intensities by the horizontal gradient information applied from switch L, as a horizontal line of output intensity points is being computed.

A central element in the spatial toner system of FIG. 7 is the H.G. accumulator 67, which is comprised of the register 69 and summer or combiner 71. At the beginning of each of the horizontal lines 0, 1 ... 9, A ... F (FIG. 1) the register 69 is reset to zero and an associated one of the new initial intensities ($I_{0,0}$, $I_{1,0}$, $I_{2,0}$, $I_{3,0}$, $I_{4,0}$, $I_{5,0}$, $I_{6,0}$, $I_{7,0}$, $I_{8,0}$, $I_{9,0}$, $I_{A,0}$, $I_{B,0}$, $I_{C,0}$, $I_{D,0}$, $I_{E,0}$ and $I_{F,0}$), developed in line IC accumulator 61 for lines 0, 1 ... 9, A ... F, is selectively passed through position 1 of switch J and stored (by way of summer 71) in the register 69 of H.G. accumulator 67. The output of the summer 71 is also the $I_M$ output pixel of the system of FIG. 7. The sequence of output pixels ($I_M$) may also be applied to a display unit 73 to view the reconstituted frame or frames.

A second input to the summer 71 is the horizontal gradient information of the picture (FIG. 1) that is applied from switch L when switch J is in position 0. As indicated before, switch J is only in position 1 at the start of each new line in order to pick up the initial intensity for that new line. At all other times switch J is in position 0.

This horizontal gradient information is applied from switch L, through position 0 of switch J to the summer 71. With each increase in the x-position of a horizontal line across a macro column, the accumulator 67 increments once to add in the summer 71 the horizontal gradient to the previous output intensity or pixel $I_M$ presently stored in the register 69 in order to develop a different output intensity or pixel (see $I_M$ in TABLE 1) for that new x-position. This different output intensity from the summer 71 is then stored in register 69 to update that register.

Switch L is fed by H.G. registers 31-36, but normally by one of the working registers 31, 33 and 35. Looking simultaneously at FIGS. 1 and 7, it can be seen in the extreme left-hand borders of macro columns 0 and 4 that there is a zero (0) horizontal gradient information in x. This is due to the fact that each of macro columns 0 and 4 contains only 1-point data or information about the left-hand side of that macro column. Therefore, there can only be a 0 horizontal gradient in either of macro columns 0 and 4. Consequently, as shown in TABLE 1, switch L will be in grounded position 0 (to pick up the 0 horizontal gradient) whenever columns 0, 1 and 2 in macro column 1 and column F in macro column 4 are being shaded in. As a result, the intensity points in columns 0, 1 and 2 of any given horizontal line or row of FIG. 1 will all have the same intensity. Also, since the intensity point in column F of any given horizontal line is unchanged, it will have the same intensity as the intensity point in column E of that horizontal line.

After a horizontal line of intensity points is shaded in across macro column 0, switch L moves to its position 2 to pick up from register 32 the proper initial condition or initial horizontal gradient value for macro column 1. This initial condition of macro column 1 is fed from register 32, through position 2 of switch L and position 0 of switch J to summer 71 in the accumulator 67. At the same time, this initial condition of macro column 1 from position 2 of switch L is looped back around through summer 59, position 0 of switch N and position 1 of switch M, and stored in working H.G. register 31 for macro column 1. Register 32 is simply a means for picking up the initial condition for the start of a horizontal line through macro column 1, while register 31 is the working register in macro column 1 whenever intensity points are being computed in macro column 1.

As the horizontal gradient information from register 31 is being used (by way of position 1 of switch L) in shading in intensity points across macro column 1 for the rest of the frame or picture, the horizontal gradient generator 21 will subsequently determine the initial (horizontal gradient) condition for macro column 1 in the next frame. That information will be computed by the generator 21, applied through position 1 of switch N and position 2 of switch M, and stored in register 32 when input pixel $P_{0,1}$ is strobed out of the FIFO 15.

So registers 31 and 32 comprise a register pair for serving macro column 1. In a similar manner, registers 33 and 34 comprise a register pair for use in macro column 2, and registers 35 and 36 comprise a register pair for use in macro column 3. Hence a register pair is used with each of the macro columns 1, 2 and 3. Note that, since macro columns 0 and 4 are border columns which have zero (0) horizontal gradients, macro column 0 and 4 do not require register pairs. As indicated in TABLE 1, the initial (horizontal gradient) conditions for macro columns 2 and 3 in the next frame are computed by generator 21 applied through position 1 of switch N, selectively applied through positions 4 and 6 of switch M, and respectively stored in registers 34 and 36 at the respective times that input pixels $P_{0,2}$ and $P_{0,3}$ are strobed out of the FIFO 15. It should be noted at this time that switch N is in position 1 only when, as previously described, horizontal gradients are being generated at the times when input pixels, $P_{0,1}$, $P_{0,2}$ and $P_{0,3}$ are being strobed out of the FIFO 15. At all other times, switch N is in position 0.

The horizontal gradient across macro column 1 is constant. Therefore, a constant input to summer 71 is applied from position 1 of switch L by way of position 0 of switch J.

When the border that exists between macro column 1 and macro column 2 is reached, the following operations occur. Register 31 is updated so that it will have the proper horizontal gradient for the next horizontal row or line. The register 31 is updated by combining in adder 59 the horizontal gradient output of register 31 from position 1 of switch L with the 2 D gradient (for the odd macro rows in macro column 1) from ÷4 circuit 57. This 2 D gradient (which is passed from register 51, through position 1 of switch P and through the ÷4 circuit 57) corresponds to the second partial derivative of equation (7) and is used to update the horizontal gradient from register 31. In a similar manner, as indicted in TABLE 1, the 2 D gradient information stored in registers 52-56 (for the remaining even and odd macro rows of macro columns 1, 2 and 3) is selectively fed out of the registers 52-56 through the ÷4 circuit 57 by way of the respective positions 2-6 of switch P to selectively update the horizontal gradients stored in the H.G. registers 31, 33 and 35. When switch P is in position 0, no horizontal gradients in registers 31, 33 and 35 are being updated. Thus, the horizontal gradient for a given line across a given macro column is updated at the completion of each macro column in order to develop the horizontal gradient for the following line across that given macro column.

The new sum (or updated horizontal gradient) at the output of summer 59, which is given by equation (5), is passed through position 0 of switch N and position 1 of switch M for storage in register 31. In this manner, register 31 is properly updated for the next horizontal line of intensity points that is to be computed across macro column 1. By adding the update information from the ÷4 circuit 57 (by way of register 51) to the old horizontal gradient output from register 31 and storing this new sum back into register 31, the second partial derivative information shown in equation (7) is integrated one step with respect to the variable y. Then subsequently, when the updated horizontal gradient is read out of register 31 through position 1 of switch L and position 0 of switch J into the H.G. accumulator 67, there is a second integration with respect to the variable x which generates the proper intensity for the output pixel from summer 71.

It has been previously discussed how the horizontal gradients across the tops of macro columns 1, 2 and 3 have been developed and stored in IC H.G. registers 32, 34 and 36 (at the respective times that $P_{0,1}$, $P_{0,2}$ and $P_{0,3}$ are strobed out of the FIFO 15). It will now be explained how those initial horizontal gradients are used in relation to horizontal line 0.

After the intensity points in line 0 (e.g. $I_{0,0}$, $I_{0,1}$, $I_{0,2}$) have been computed across macro column 0 and macro column 1 is entered, switch L is moved to position 2 to read out from register 32 the proper initial horizontal gradient condition for macro column 1. This initial condition of macro column 1 is fed from register 32 to the summer 71 in the accumulator 67 by way of position 2 of switch L and position 0 of switch J to increment the accumulator 67 by the horizontal gradient at the next x-position in macro column 1 (when $I_{0,3}$ is generated). This initial horizontal gradient condition of macro column 1 is also fed back from position 2 of switch L through summer 59, position 0 of switch N and position 1 of switch M and stored in working register 31 for macro column 1. Across each x-position in line 0 across the rest of macro column 1, a constant input to the summer 71 is supplied from working register 31 through position 1 of switch L and position 0 of switch J.

After the intensity points in line 0, (e.g. $I_{0,3}$, $I_{0,4}$, $I_{0,5}$, $I_{0,6}$) have been computed across macro column 1 and macro column 2 is entered, switch L is moved to position 4 to read out from register 34 the proper initial horizontal gradient condition for macro column 2. This initial condition of macro column 2 is fed from register 34 to the summer 71 in the accumulator 67 by way of position 4 of switch L and position 0 of switch J to increment the accumulator 67 by the horizontal gradient at the next x position in macro column 2. This initial condition of macro column 2 is also fed back from position 4 of switch L through summer 59, position 0 of switch N and position 3 of switch M, and stored in working register 33 for macro column 2. Across each x-position in line 0 across the rest of macro column 2, a constant input to summer 71 is applied from working register 33 through position 3 of switch L and position 0 of switch J.

When a horizontal line of intensity points is to be computed across macro column 3 in output line 0, the proper initial horizontal gradient for macro column 3 is read out of register 36, applied through position 6 of switch L and position 0 of switch J to the summer 71 in the accumulator 67. This initial condition is also fed back from position 6 of switch L through summer 59, position 0 of switch N and position 5 of switch M, and stored in working register 35 for macro column 3. Across the rest of macro column 3, a constant input to summer 71 is applied from working register 35 through position 5 of switch L and position 0 of switch J. In this manner, registers 36 and 35 are used in conjunction with the accumulator 67 to compute the output intensity points or pixels (e.g. $I_{0,B}$, $I_{0,C}$, $I_{0,D}$, $I_{0,E}$) in line 0 across macro column 3. When switch M is in its position 0, no new data is stored or restored into any of the registers 31–36.

Notice that when a line of points of output line 0 (as well as output lines 1–9 and A–F) is in macro column 4, there is once again a zero (0) horizontal gradient, since macro column 4 only contains 1-point data information about the left-hand side of that macro column. Therefore, switch L reverts back to its 0 or grounded position for the last output pixel in column F of macro column 4 (e.g. $I_{0,F}$). When switch L is in position 0 (in columns 0, 1, 2 and F of each line, a 0 horizontal gradient is applied to H.G. accumulator 67.

Since, as discussed before, there is no vertical gradient between lines 0 and 1 and between lines 1 and 2, the intensity points computed across lines 1 and 2 will be identical to the previously computed intensity points in the corresponding x-positions across line 0.

After each portion of each of the horizontal lines 2–9 and A–E of intensity points (I's) has been selectively computed through each of the macro columns, the associated one of the horizontal gradients in the registers 31, 33 and 35 is updated for the next horizontal line. As discussed before, this updating of the horizontal gradients entails the selective utilization of the two-dimensional gradient signals (or the second partial differential information of equation (7)) from registers 51 and 52 to update the horizontal gradient for macro column 1, from registers 53 and 54 to update the horizontal gradient for macro column 2, and from registers 55 and 56 to update the horizontal gradient for macro column 3. The 2 DG registers 51–56, like the H.G. registers 31–36, are arranged in three pairs, with one pair for each of macro columns 1, 2 and 3. Within any given pair of the registers 51–56, one register is used with odd macro rows in an associated macro column, while the other register is used with even macro rows in the associated macro column. As indicated in TABLE 1, only one of the registers 51–56 is used at any given time—to either store or read out 2 DG information. Therefore, one register of a pair cannot disturb the other register of the pair.

It will now be shown how the horizontal gradient for each of the macro columns 1, 2 and 3 in line 2 is selectively updated after a line of intensity points is computed across each of the macro columns. When intensity points are being computed in line 2 (for example) of macro row 1, the information for the selective updatings of macro columns 1, 2 and 3 in macro row 1 are respectively stored in registers 51, 53 and 55.

A horizontal gradient for a macro column (1, 2 or 3) is updated in preparation for the next pass through that macro column, but on the next line. It will be recalled that a horizontal gradient is updated as a function of the vertical gradient. From TABLE 1 and FIG. 1, it can be seen that there is a 0 vertical gradient between lines 0 and 1, between lines 1 and 2, and between lines E and F. However, there is a vertical gradient between, for example, lines 2 and 3. Hence, each horizontal gradient through a macro column in line 2 is updated to obtain the proper horizontal gradient through that macro column in line 3. To illustrate this, the updating of each of the horizontal gradients associated with macro columns 1, 2 and 3 along line 2 (in macro row 1) will now be explained to show how the updated horizontal gradients are respectively derived for use along line 3 through macro columns 1, 2 and 3. After the line of intensity points ($I_{2,2}$, $I_{2,3}$, $I_{2,4}$, $I_{2,5}$, $I_{2,6}$) has been computed along line 2 across macro column 1, the horizontal gradient stored in register 31 for macro column 1 along line 2 is updated for subsequent use for macro column 1 along line 3. In accomplishing this horizontal gradient update (at the time that $I_{2,6}$ is being generated), the content of register 51 is divided by four by the ÷4 circuit 57, summed in summer 59 with the content of H.G. register 31 and then the resultant sum is stored in register 31.

It should be noted at this time that each new sum (or updated horizontal gradient) at the output of the summer 59 is given by equation (5).

After the line of intensity points along line 2 and across macro column 2 has been completed (when $I_{2,A}$ is being generated) the horizontal gradient stored in register 33 is updated for subsequent use in line 3 across macro column 2. This update is accomplished (at the time $I_{2,A}$ is being generated) by summing the content of register 53 (by way of the ÷4 circuit 57) with the content of register 33 and placing that resultant sum in the register 33. Similarly, after the line of intensity points along line 2 and across macro column 3 has been completed, the horizontal gradient content of register 35 is updated (at the time $I_{2,E}$ is being generated) by summing it with the content of register 55 (by way of the ÷4 circuit 57) and placing the resultant sum in the register 35.

Later when intensity points have been computed for a line in macro row 2 (line 6, for example) and across macro column 1, the H.G. content of register 31 is updated at the time $I_{6,6}$ is being generated by summing the H.G. register 31 content with the 2 DG gradient update content of register 52 (by way of ÷4 circuit 57) and storing the sum in register 31. Similarly, when intensity points have been computed for line 6 across macro column 2 (macro column 3), the H.G. content of register 33 (register 35) is updated at the time $I_{6,A}$ ($I_{6,E}$) is being generated by summing the H.G. register content with the 2 DG update content of register 54 (register 56) (by way of ÷4 circuit 57) and storing the resultant sum in register 33 (register 35).

So, the 2 DG register pairs are used in the formation of the second partial derivative of equation (7), with registers 51 and 52 for macro column 1, registers 53 and 54 for macro column 2, and registers 55 and 56 for macro column 3. No register pairs are needed for either of macro columns 0 and 4, as indicated before, because there is a zero (0) horizontal gradient across each of them.

The generation and storage of the initial intensity condition of the frame or picture (of FIG. 1), the horizontal gradients, the vertical gradients and the two-dimensional gradients have been discussed above in detail. All of these signals are selectively utilized by the system of FIG. 7, as previously discussed, in the generation of the sequence of output pixels ($I_M$), $I_{0,0}$ ... $I_{F,F}$ of TABLE 1, at the output of the summer 71. Each of the output pixels ($I_M$) from the summer 71 satisfies the requirements of equation (4) in that it is comprised of the sum of four terms: the initial intensity $I_{0,0}$ of the frame from register 41; the vertical gradient from registers 43 and 45 incremented in y-position in the accumulator 61 in order to update the initial intensity $I_{0,0}$ of the frame to give the initial intensity of each line; and the combination of the horizontal gradients from registers 31–36 and the two dimensional gradients (incremented in y-position) from the registers 51–56 by way of ÷4 circuit 57, the combination being incremented in x-position in the accumulator 67.

Space limitations preclude a discussion on how every one of the output pixels ($I_M$) is generated for even the exemplary TABLE 1. However, the timing and operation of the switches J, K, L, M, N, P and Q and circuits of FIG. 7 in conjunction with TABLES 1 and 2 have been explained in detail. In addition, the generation of the four terms common to each output pixel, as well as of some of the output pixels, have been discussed in detail in relation to the spatial toner system of FIG. 7. Therefore, by simultaneously examining the instruction set of TABLE 1 and FIGS. 1 and 7, it should be readily apparent to those skilled in the art how the remaining pixels of TABLE 1 are developed at the output of the summer 71 by double linear interpolation.

The invention thus provides a simple apparatus (and method) for image reconstitution which is responsive to a sequence of received data-compacted pixels representing a two-dimensional coarse block image of a remote scene for computing by double linear interpolations intermediate picture point intensities in each of a plurality of horizontal lines to smoothly shade in the received coarse block image.

While the salient features have been illustrated and described in a preferred embodiment of the invention, it should be readily apparent to those skilled in the art that modifications can be made within the spirit and scope of the invention as set forth in the appended claims.

I claim:

1. An apparatus for reconstituting picture point intensity signals representative of a video image from a sequence of two-dimensional, data-compacted, received pixels, said apparatus comprising:
   - means for utilizing the first one of the sequence of received data-compacted pixels to develop the initial intensity of the first one of a plurality of horizontal lines in a reconstituted picture;
   - means for selectively generating horizontal and vertical gradient information as a function of the received pixels;
   - means selectively responsive to the initial intensity of any given horizontal line in the reconstituted picture and to associated vertical gradient information for developing by a first interpolation the initial intensity for the following horizontal line; and
   - means selectively responsive to the initial intensity of said given horizontal line and to the horizontal gradient information associated with said given horizontal line for computing a sequence of picture point intensity signals along said given horizontal line by second interpolations.

2. An apparatus responsive to a sequence of received data-compacted pixels derived from a raster-scanned image of a scene for generating a reconstructed scene by linearity smoothing the image intensity of the pixels in two dimensions, said apparatus comprising:
   - means for selectively developing the first image intensity of the reconstructed picture, horizontal gradient information and vertical gradient information as a function of the received pixels;

means selectively responsive to the first picture point intensity and the vertical gradient information for developing the initial intensity for each of the horizontal lines of output picture points as a function of the vertical position of each of said horizontal lines;

means for selectively integrating the horizontal gradient information of any given line with the initial intensity of said given line to develop a horizontal line of picture point intensities for said given line; and means for updating the horizontal gradient information of any given line to develop updated horizontal gradient information for the next horizontal line.

3. An apparatus for producing from a sequence of pixels, representing a data-compacted television picture, a reconstituted two-dimensionally interpolated picture comprised of a plurality of horizontal lines with each line containing a plurality of picture points, said apparatus comprising:

input means selectively responsive to the sequence of pixels for generating horizontal and vertical gradient information;

first means coupled to said input means for utilizing the first one of the sequence of pixels to develop the initial intensity for the first horizontal line;

second means selectively responsive to the initial intensity of a horizontal line in the reconstituted picture and to the vertical gradient information for developing by a first interpolation the initial intensity for the following horizontal line;

third means for selectively combining interpolations of the horizontal gradient information with the initial intensity of any given horizontal line to develop by second interpolations a horizontal line of picture points; and fourth means coupled to said input means for updating the horizontal gradient information as a function of the vertical gradient information.

4. A machine method responsive to an input sequence of pixels derived from a data-compacted remote image for developing picture points representative of a smoothly shaded-in reconstituted remote image, said method comprising the steps of:

using the first one of the input sequence of pixels as the initial intensity of the reconstituted remote image;

selectively generating horizontal and vertical gradient information as a function of the input sequence of pixels;

developing by first interpolations of vertical gradient information the initial intensity of each one of a plurality of horizontal lines from the input sequence of pixels;

generating by second interpolations of horizontal gradient information a plurality of picture points in each of the plurality of horizontal lines as a function of surrounding sets of the input sequence of pixels and the initial intensities of the plurality of horizontal lines; and displaying in a raster scan fashion the picture points generated by the first and second interpolations in the smoothly shaded-in reconstituted remote image.

5. A machine method for producing picture points representative of a smoothly shaded-in reconstituted image from an input sequence of pixels representative of a data-compacted image, said method comprising the steps of:

developing the frame initial intensity and horizontal and vertical gradient information from the input sequence of pixels;

generating by first interpolations the initial intensity of each one of a plurality of horizontal lines in the reconstituted image from the frame initial intensity and vertical gradient information; and generating by second interpolations a sequence of picture points along each of the plurality of horizontal lines from the initial intensities of the plurality of horizontal lines and the vertical and horizontal gradient information.

6. A machine method for reconstituting picture point intensity signals representative of a video image from a sequence of two-dimensional, data-compacted received pixels, said method comprising the steps of:

developing the initial intensity of a reconstituted image from the first one of the sequence of received pixels;

extracting horizontal and vertical gradient information from the sequence of received pixels;

generating the initial intensity of a horizontal line from the vertical gradient information and the initial intensity of the previous horizontal line; and utilizing the initial intensity of horizontal line and the vertical and horizontal gradient information to compute a sequence of picture point intensity signals along said horizontal line.

* * * * *